(12) United States Patent
Iwanaga

(10) Patent No.: US 7,760,173 B2
(45) Date of Patent: Jul. 20, 2010

(54) PROJECTION DISPLAY APPARATUS HAVING IMAGE MODULATION TIMING CHANGING FUNCTION

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 974 days.

(21) Appl. No.: 11/483,377

(22) Filed: Jul. 7, 2006

(65) Prior Publication Data

US 2007/0013965 A1     Jan. 18, 2007

(30) Foreign Application Priority Data

Jul. 11, 2005   (JP)   ............................. 2005-201577

(51) Int. Cl.
  *G09G 3/34* (2006.01)
(52) U.S. Cl. .......................................... 345/85; 345/84
(58) Field of Classification Search .................. 345/84; 348/270, 744; 352/38–56; 353/84; 359/885–892
  See application file for complete search history.

(56) References Cited

U.S. PATENT DOCUMENTS

| 6,147,720 | A  |    | 11/2000 | Guerinot et al. |         |
|-----------|----|----|---------|-----------------|---------|
| 6,324,006 | B1 | *  | 11/2001 | Morgan ........................ | 359/618 |
| 6,567,134 | B1 |    | 5/2003  | Morgan          |         |
| 6,726,333 | B2 | *  | 4/2004  | Huibers et al. ................. | 353/84  |
| 6,795,140 | B2 | *  | 9/2004  | Shigeta ......................... | 349/106 |
| 7,012,577 | B2 | *  | 3/2006  | Wada et al. .................... | 345/32  |
| 7,066,605 | B2 | *  | 6/2006  | Dewald et al. ................. | 353/84  |
| 2002/0109821 | A1 |  | 8/2002 | Huibers et al. |         |
| 2005/0001995 | A1 |  | 1/2005 | Dewald et al.  |         |
| 2005/0184926 | A1 |  | 8/2005 | Wada et al.    |         |
| 2006/0215128 | A1 |  | 9/2006 | Iwanaga        |         |
| 2006/0221026 | A1 | * | 10/2006 | Roth et al. .................... | 345/88 |
| 2007/0024813 | A1 | * | 2/2007 | Blonde et al. ................. | 353/31 |
| 2007/0058088 | A1 |  | 3/2007 | Schubert et al. |         |

FOREIGN PATENT DOCUMENTS

| JP | 11-264953 A   | 9/1999 |
| JP | 2002-006395 A | 1/2002 |

(Continued)

OTHER PUBLICATIONS

U.S. Appl. No. 11/387,341, filed Mar. 23, 2006; Masakuni Iwanaga; Projector Having a Color Wheel Including Intermediate Color Filters.

Primary Examiner—Alexander Eisen
Assistant Examiner—Kelly Hegarty
(74) Attorney, Agent, or Firm—Frishauf, Holtz, Goodman & Chick, P.C.

(57) ABSTRACT

A projection display apparatus has a light source for emitting a white spotlight, a color wheel on which a plurality of transmission areas having different light transmission characteristics are arranged in the circumferential direction, a modulation unit which modulates the spotlight based on image data in a mixed-color period in which, along with the rotation of the color wheel, the spotlight from the light source passes through the color wheel at the boundary between a first transmission area and a second transmission area adjoining each other and having different transmission characteristics, and a timing change unit which changes the timing at which image data based on which the spotlight is modulated is switched to another one.

17 Claims, 33 Drawing Sheets

FOREIGN PATENT DOCUMENTS

| | | |
|---|---|---|
| JP | 2004-045989 A | 2/2004 |
| JP | 2004-205798 A | 7/2004 |
| JP | 2004-245886 A | 9/2004 |
| WO | WO 2004/102245 A1 | 11/2004 |
| WO | WO 2005/011288 A2 | 2/2005 |
| WO | WO 2005/019909 A2 | 3/2005 |

* cited by examiner

FIG. 1
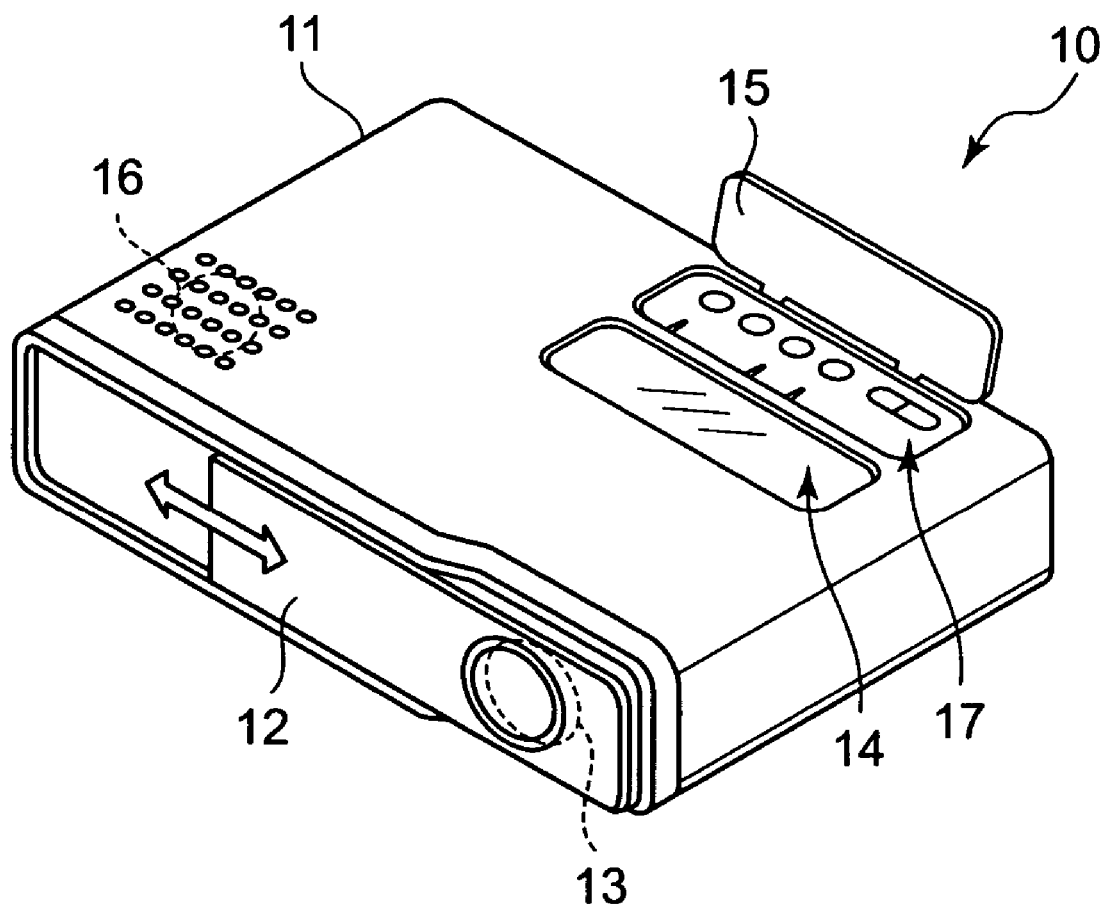

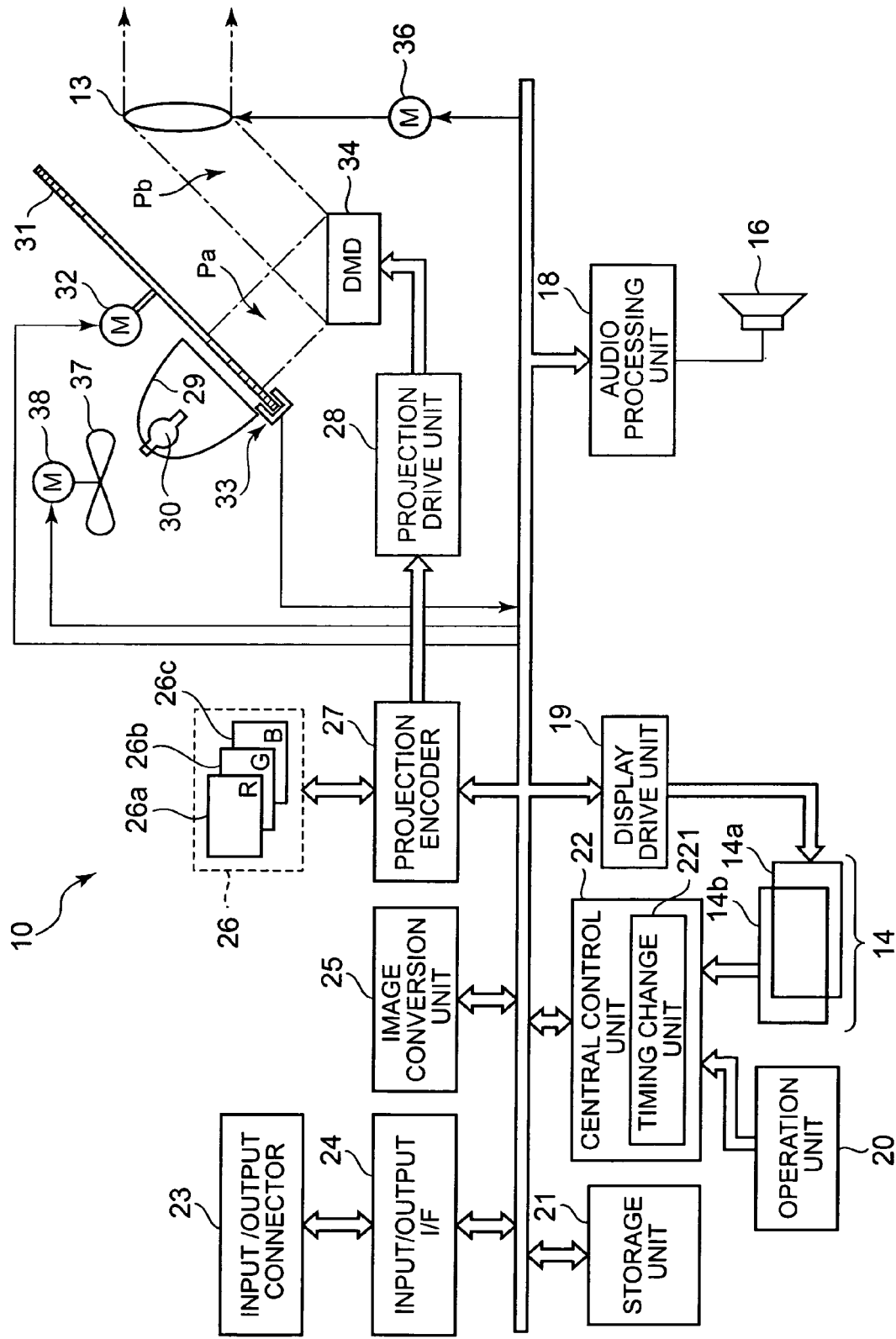
FIG. 2

FIG. 3A
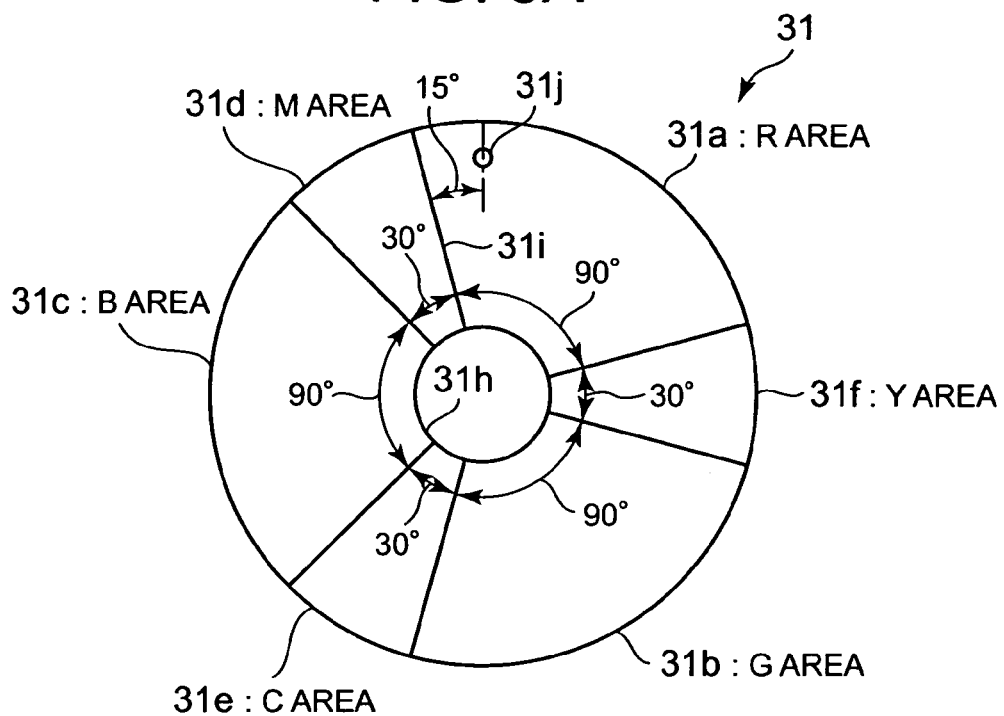
FIG. 3B
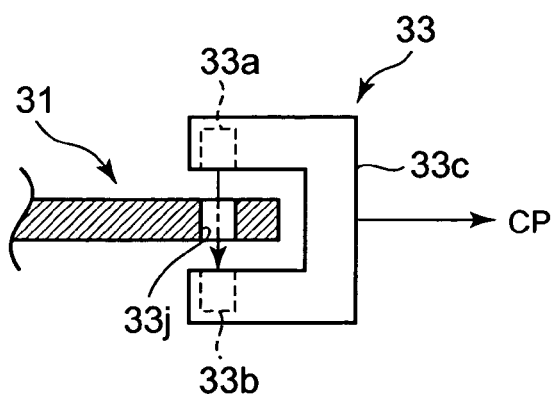
FIG. 3C
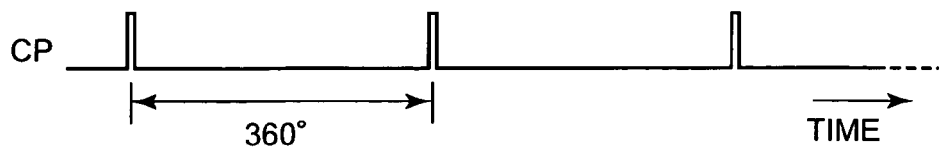

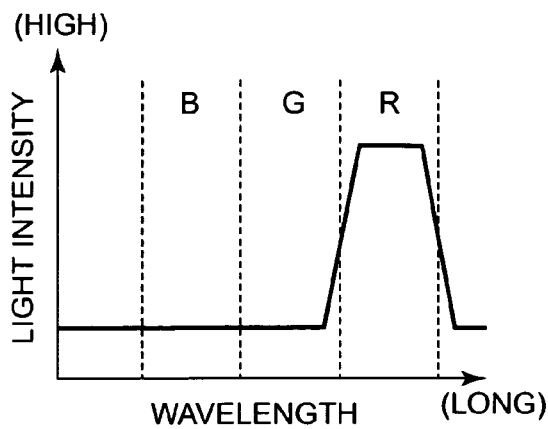
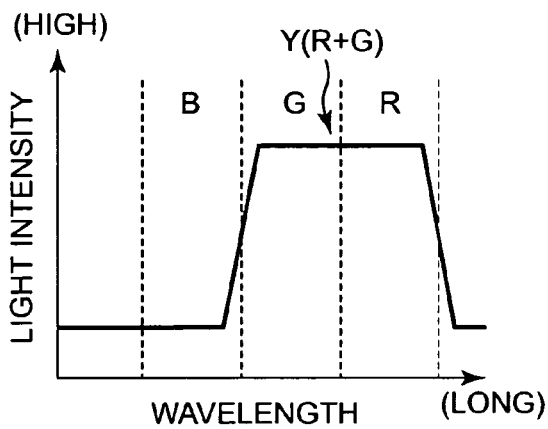
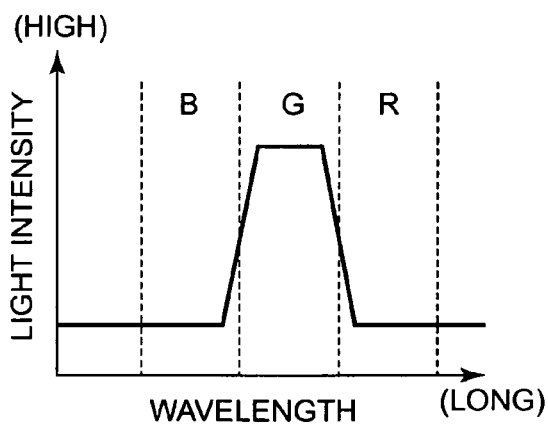
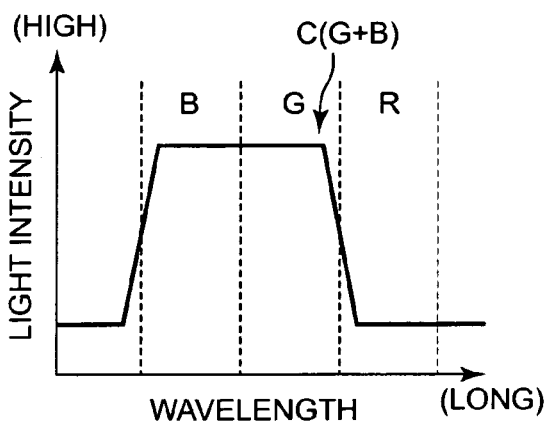
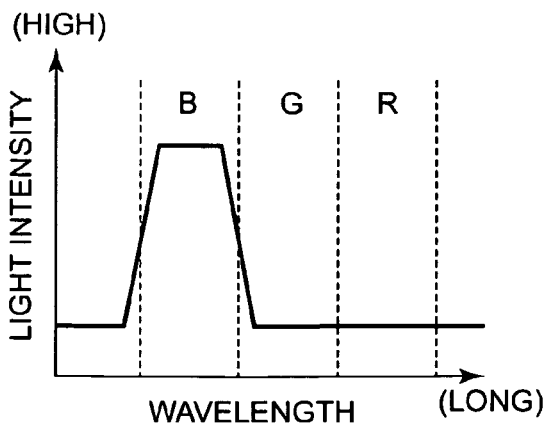
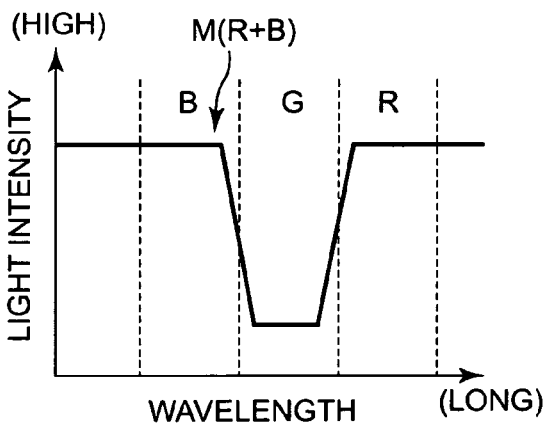

FIG. 5
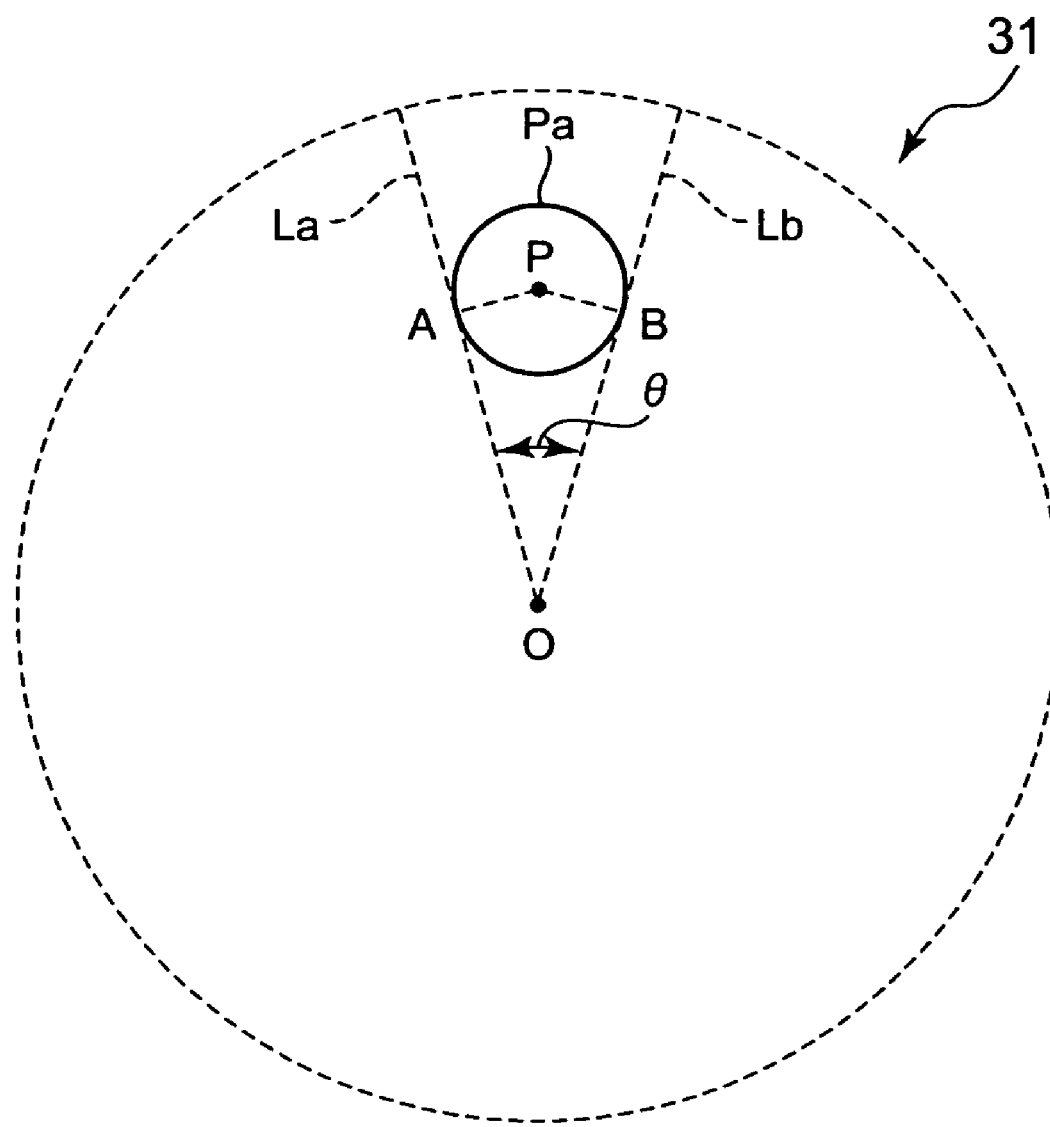

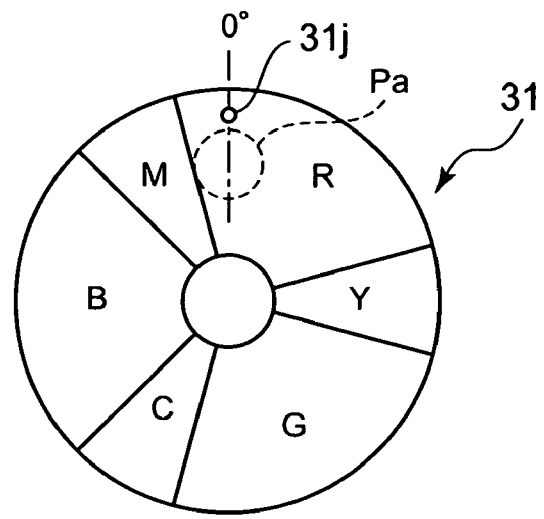
FIG. 6A
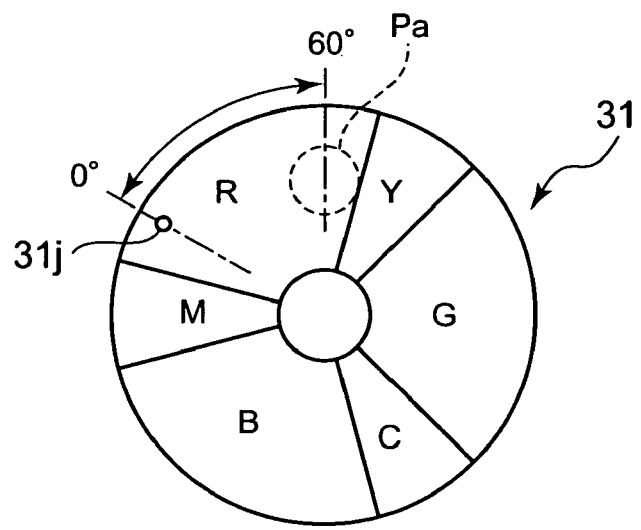
FIG. 6B
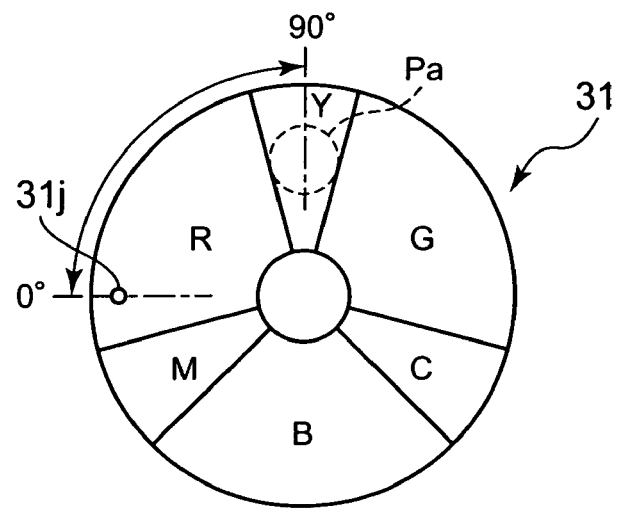
FIG. 6C

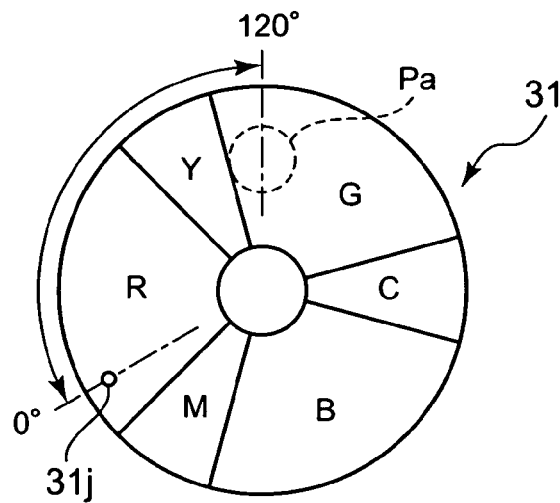
FIG. 7A
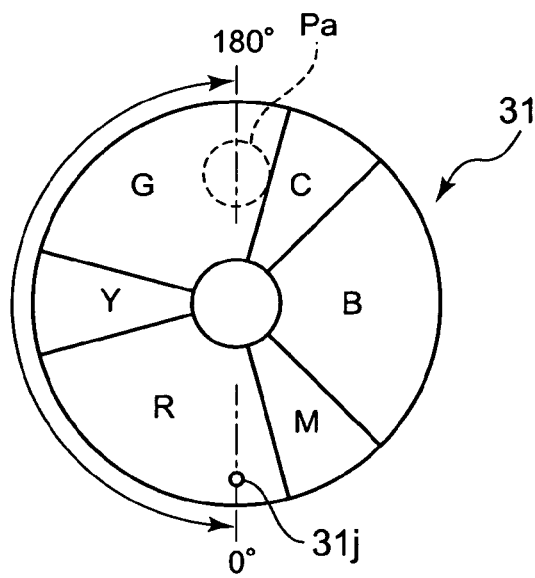
FIG. 7B
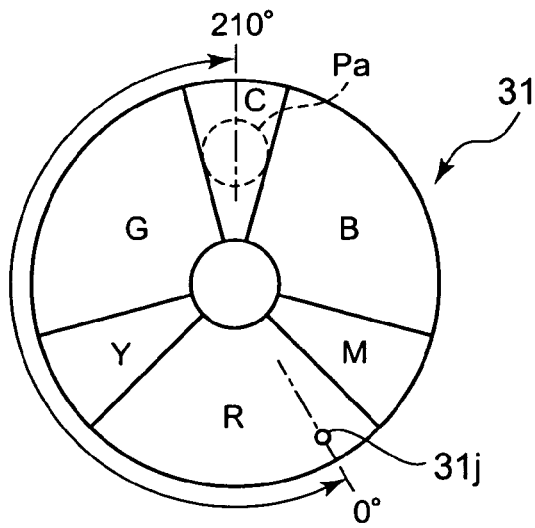
FIG. 7C

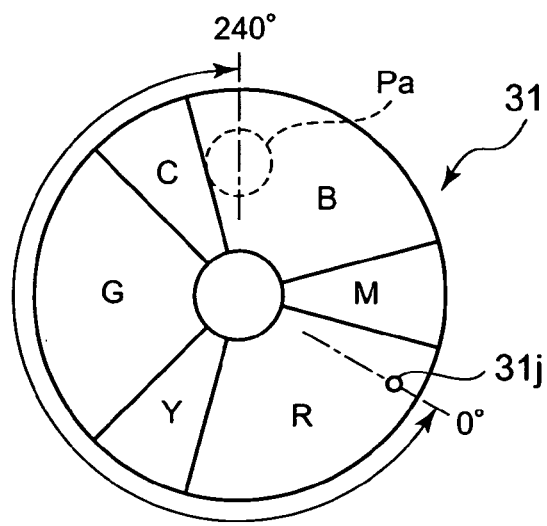
FIG. 8A
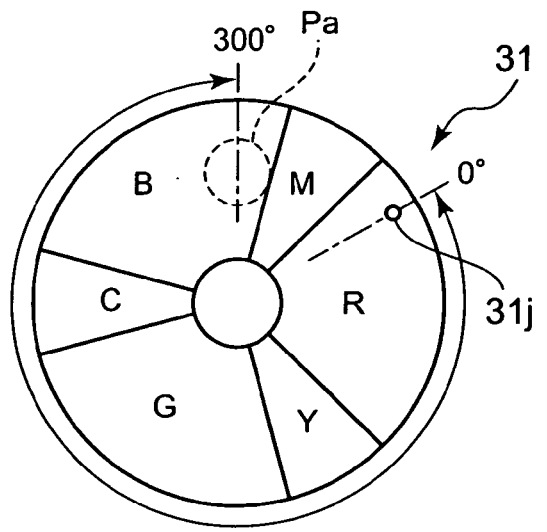
FIG. 8B
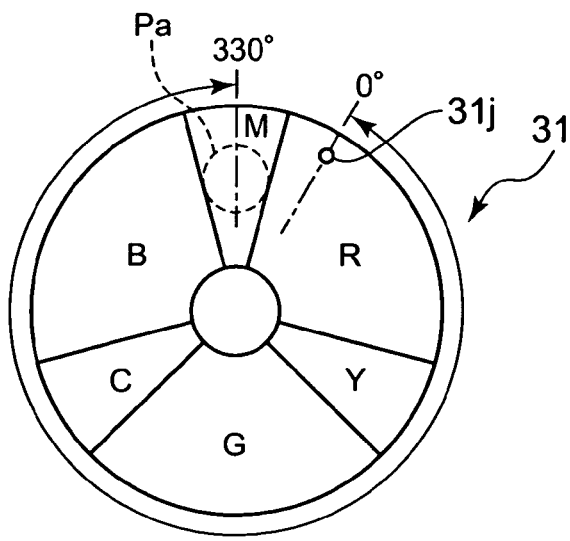
FIG. 8C

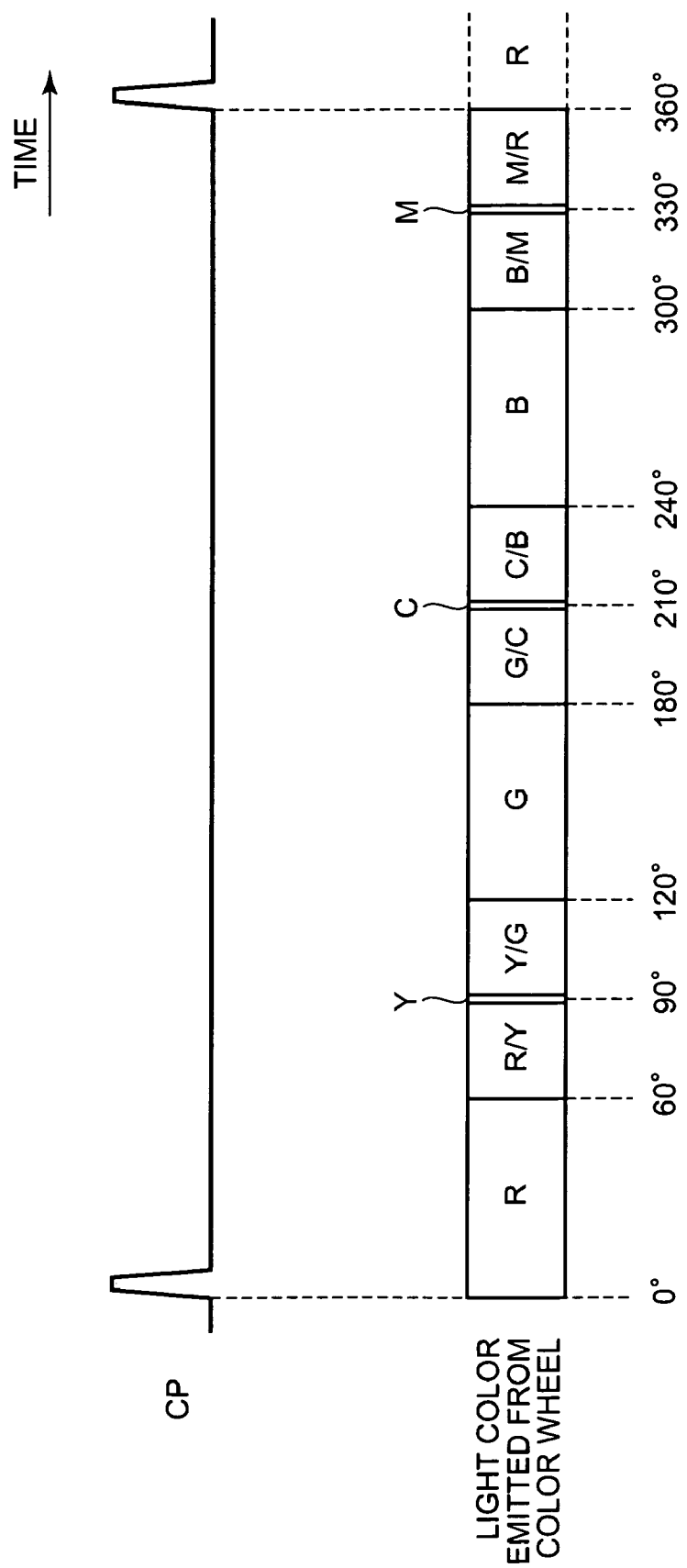

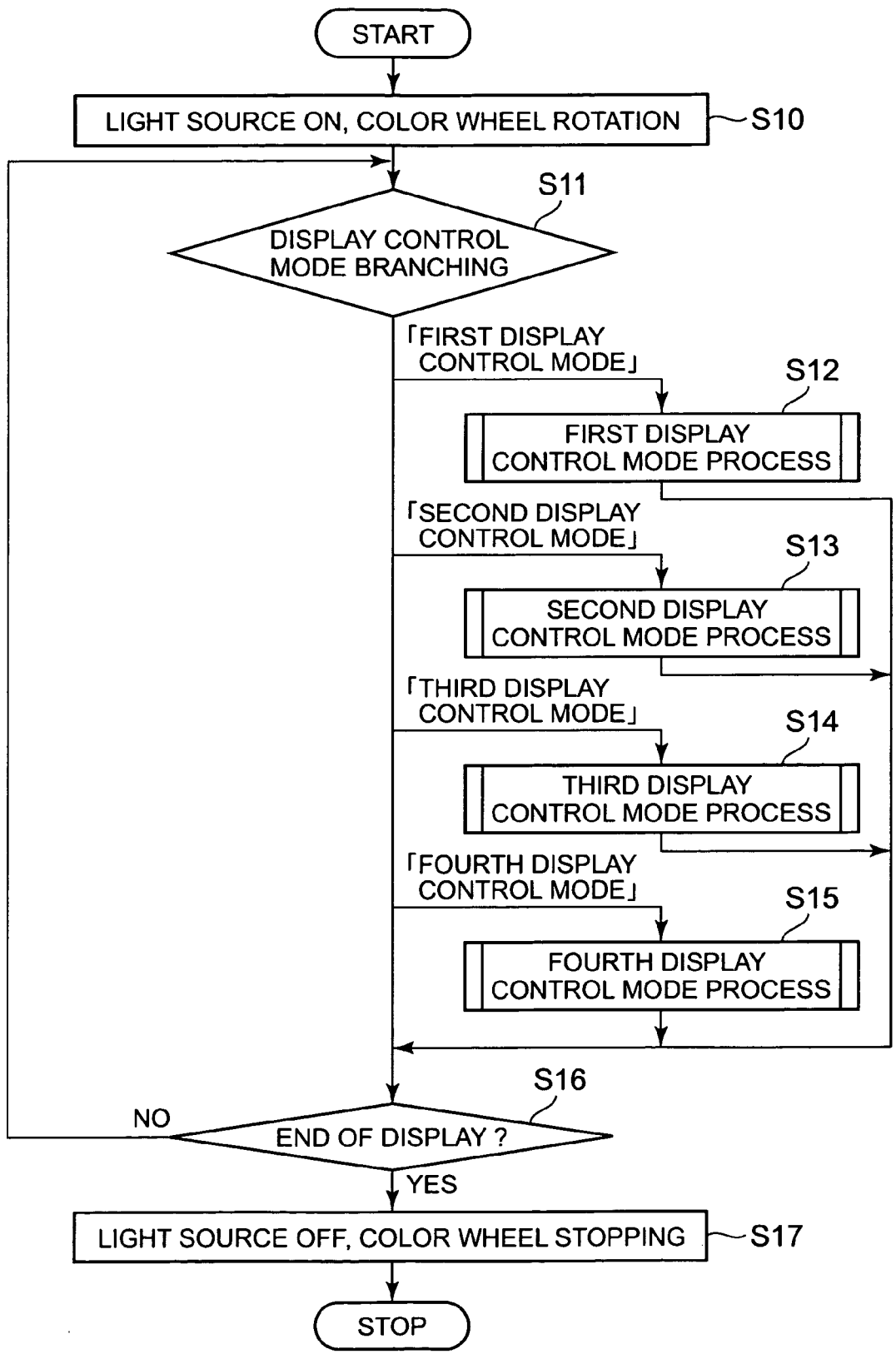
FIG. 10

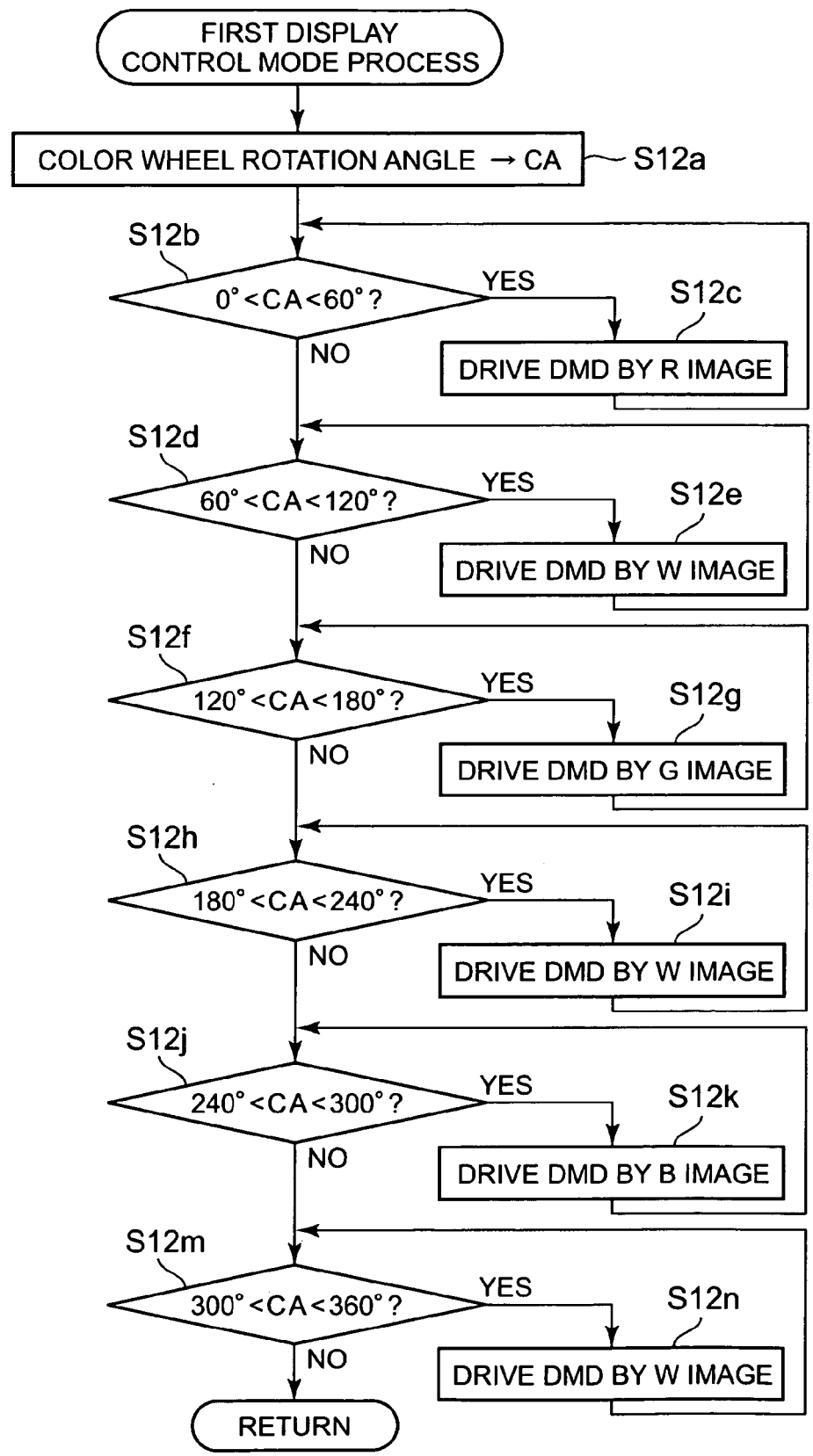
FIG. 11

FIG. 12
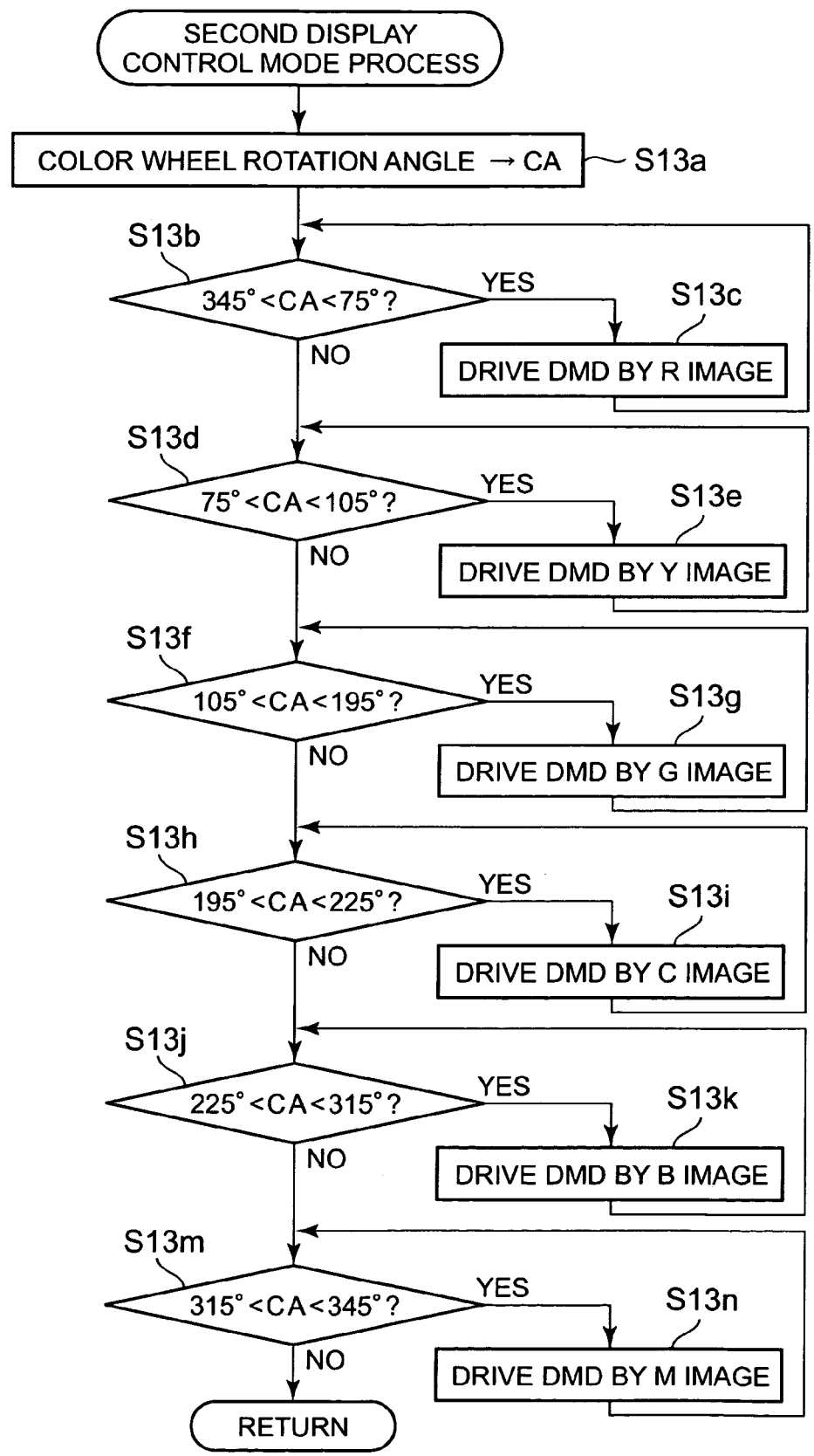

FIG. 13
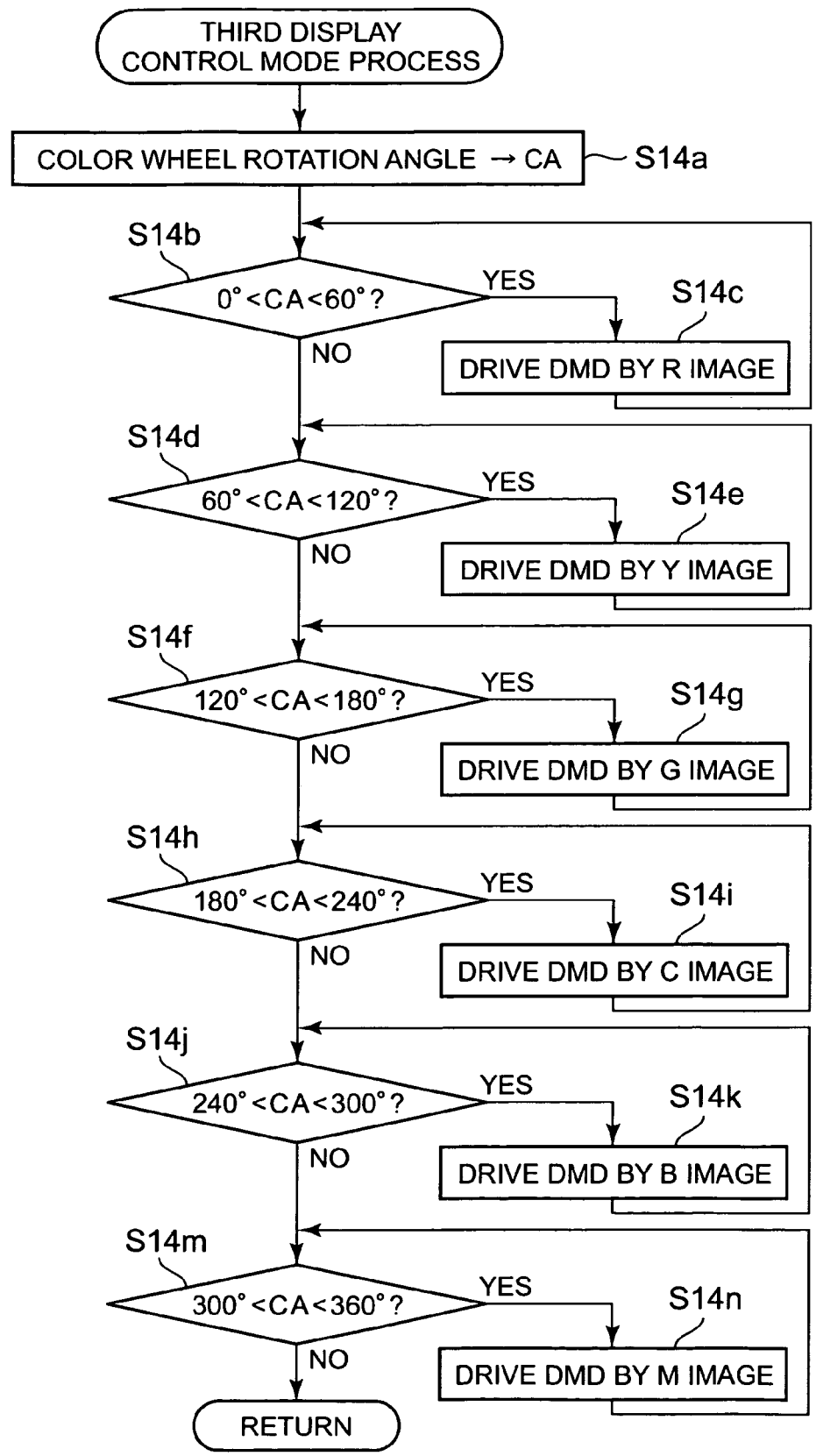

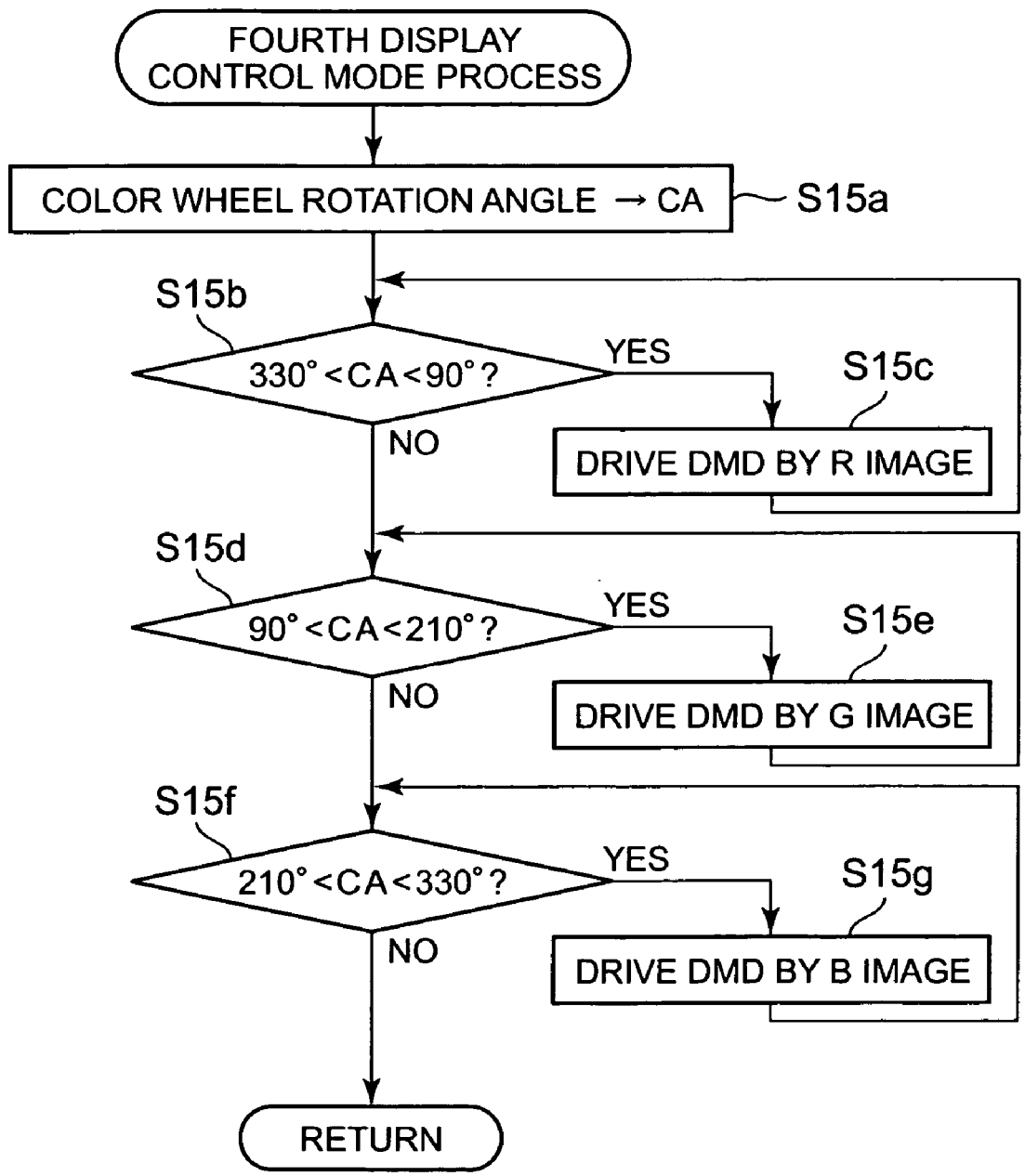
FIG. 14

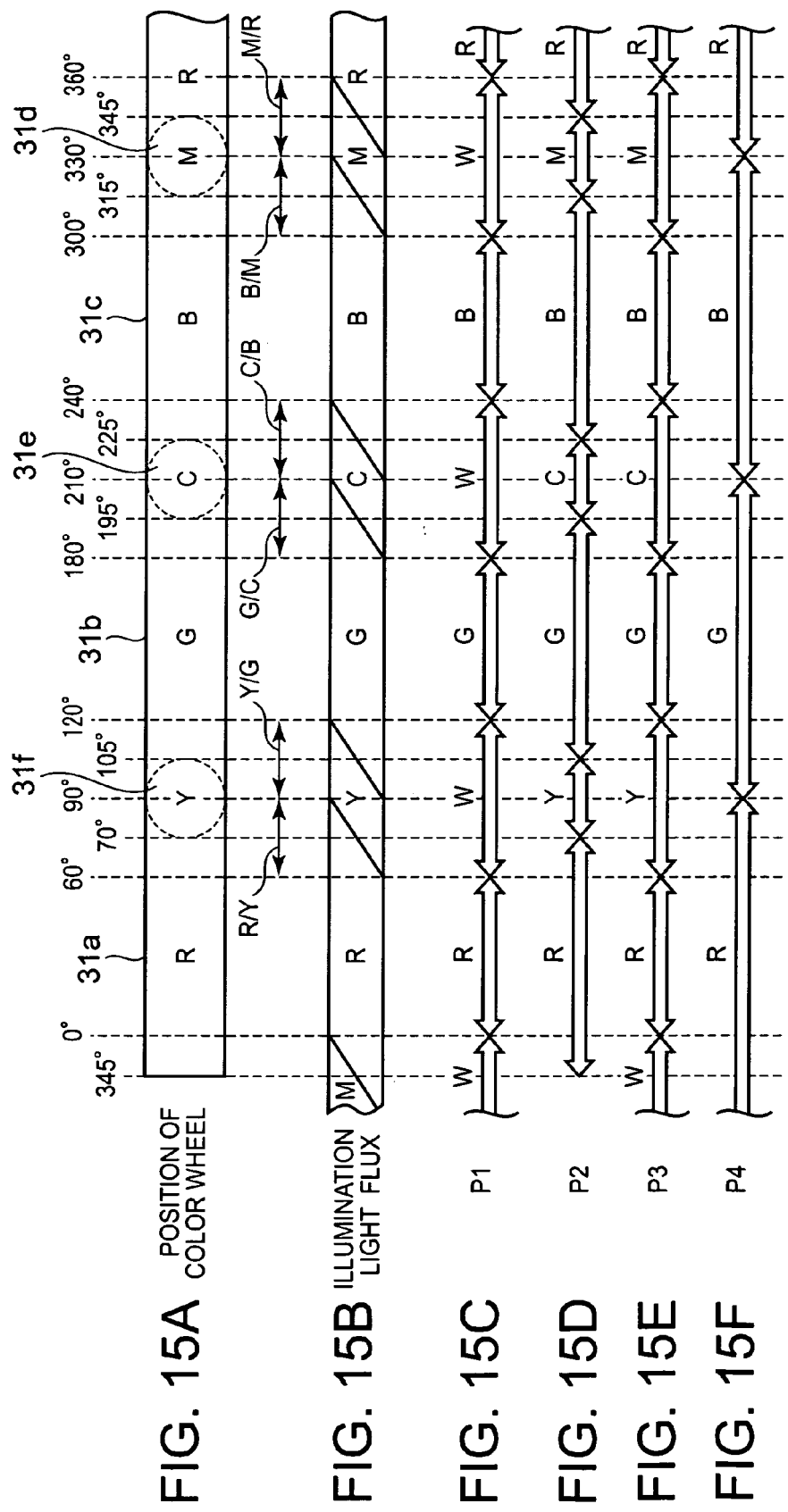

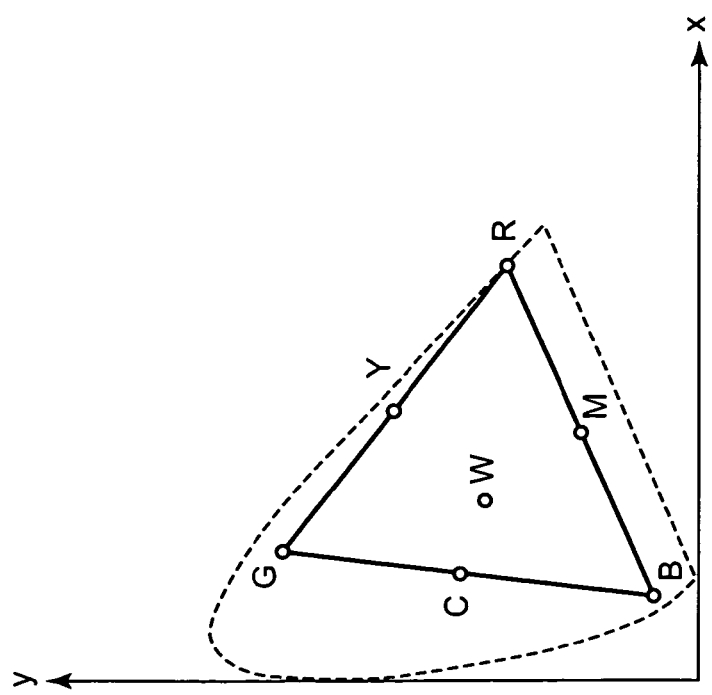
FIG. 16B
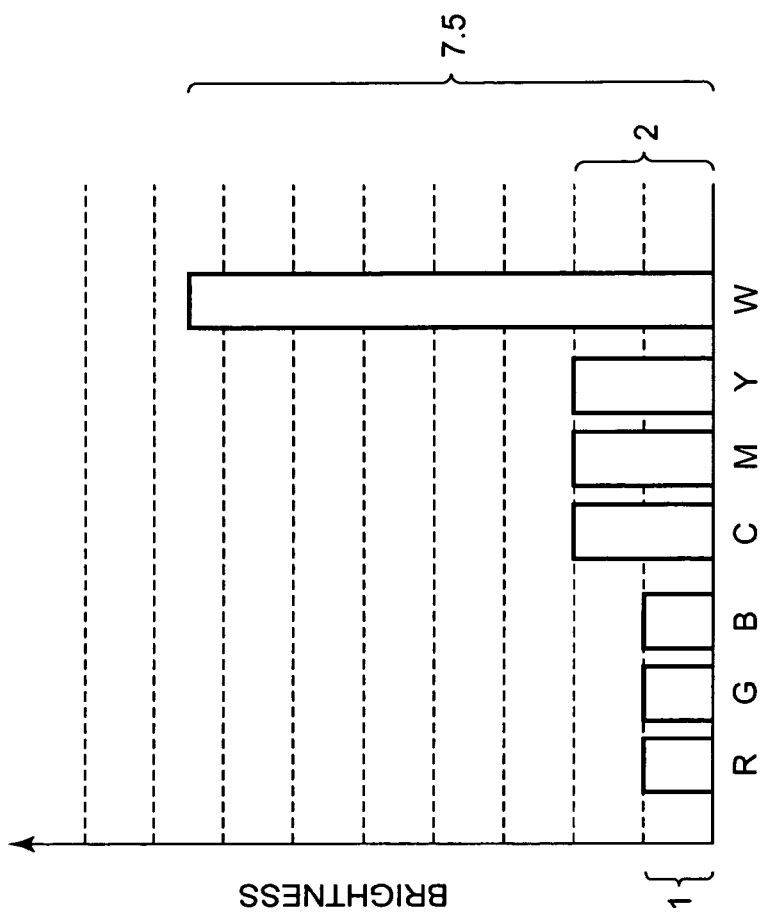
FIG. 16A

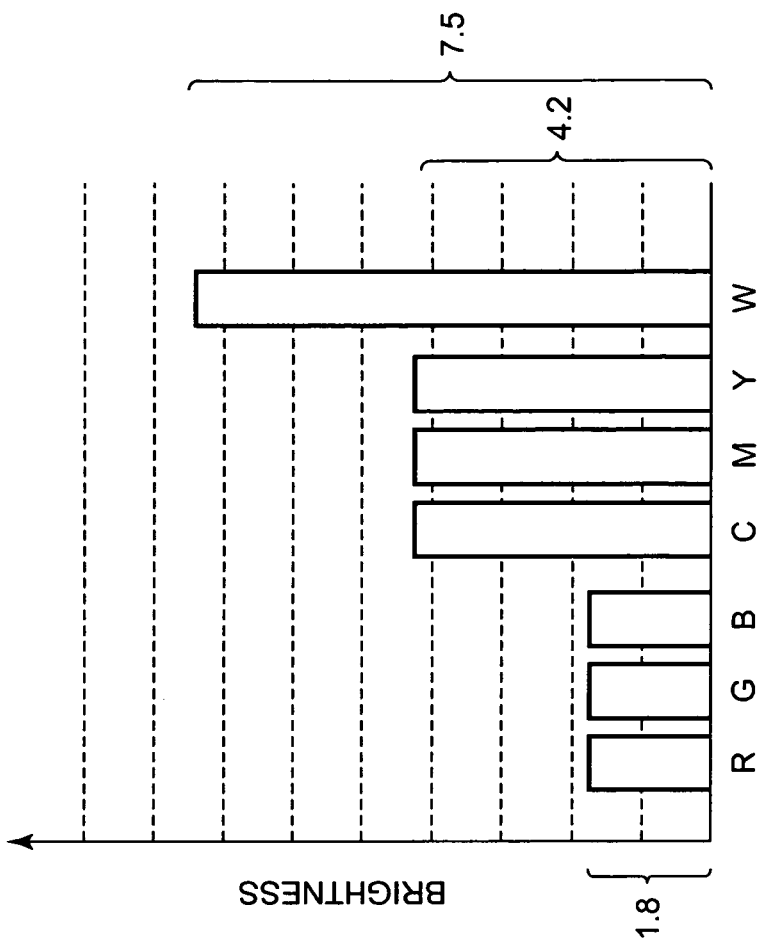
FIG. 17B
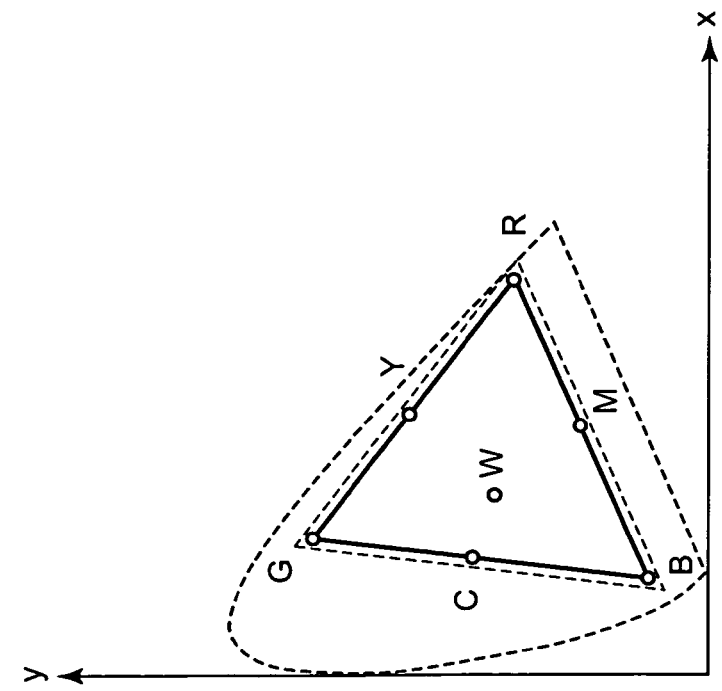
FIG. 17A

FIG. 18A
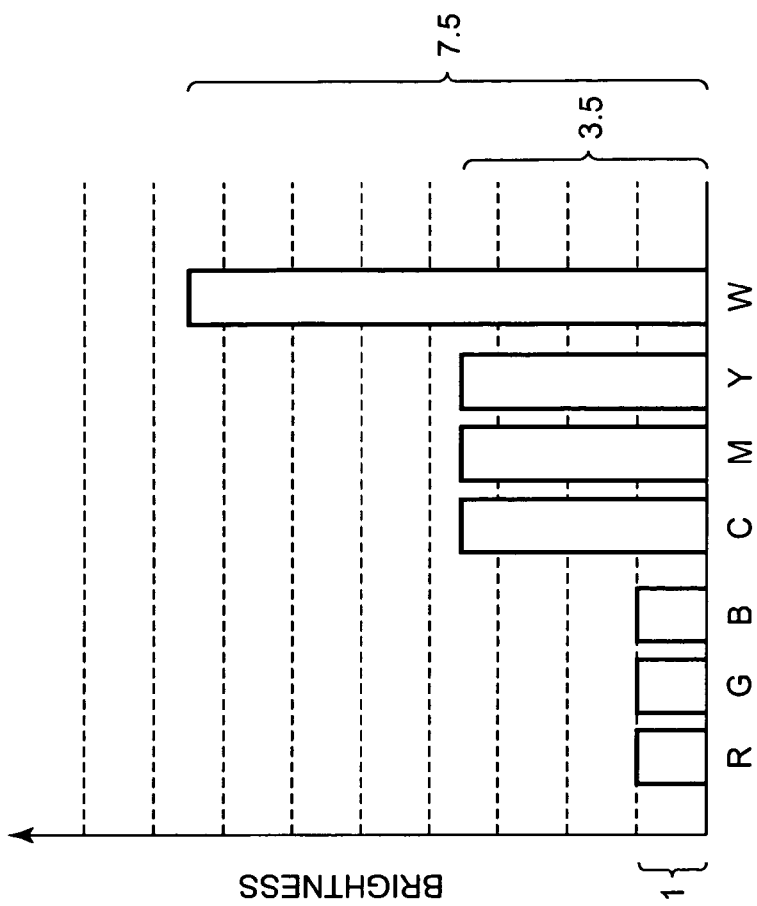
FIG. 18B
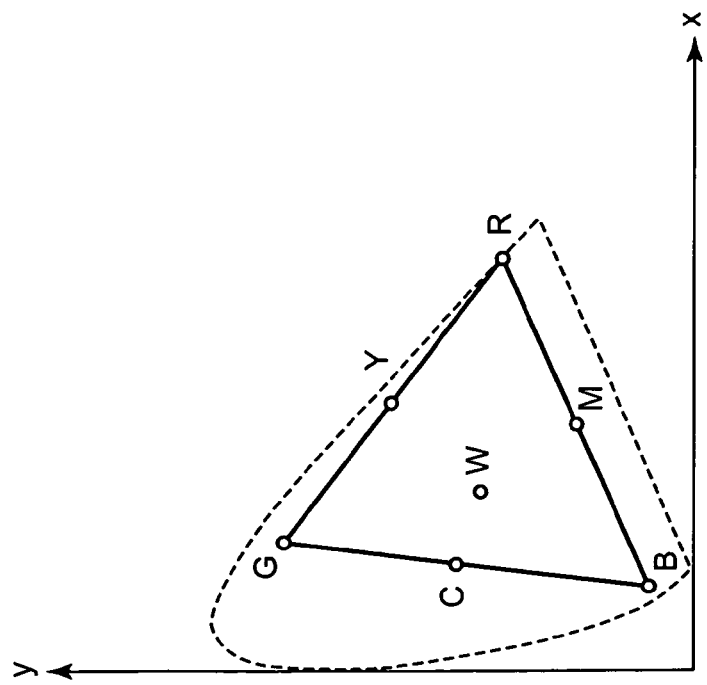

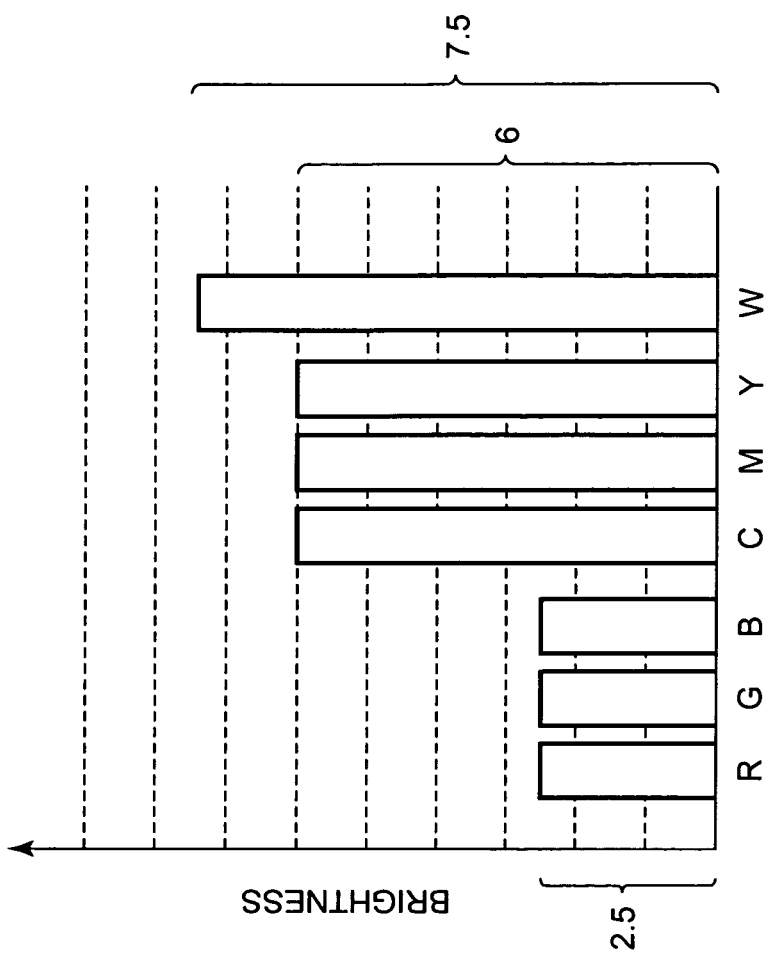
FIG. 19B
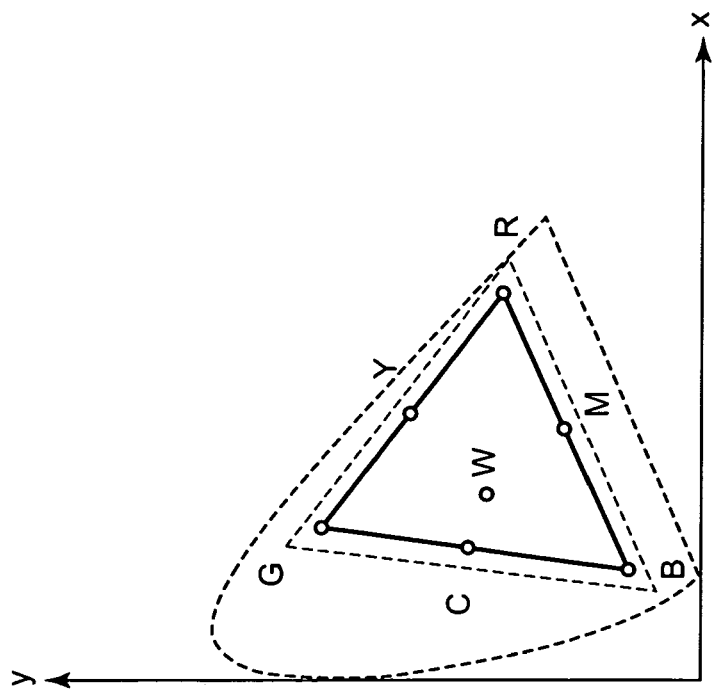
FIG. 19A

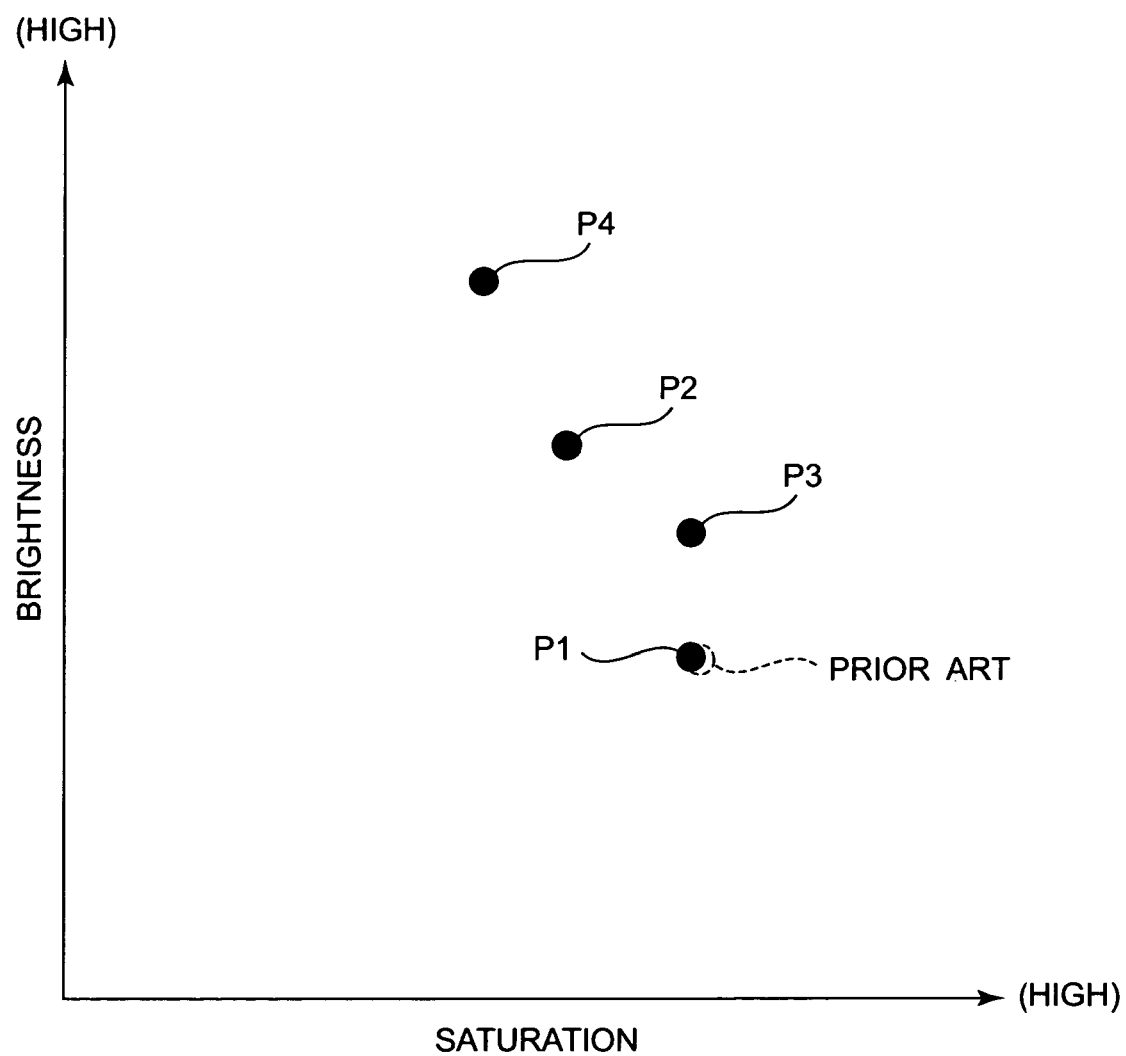
FIG. 20

FIG. 21
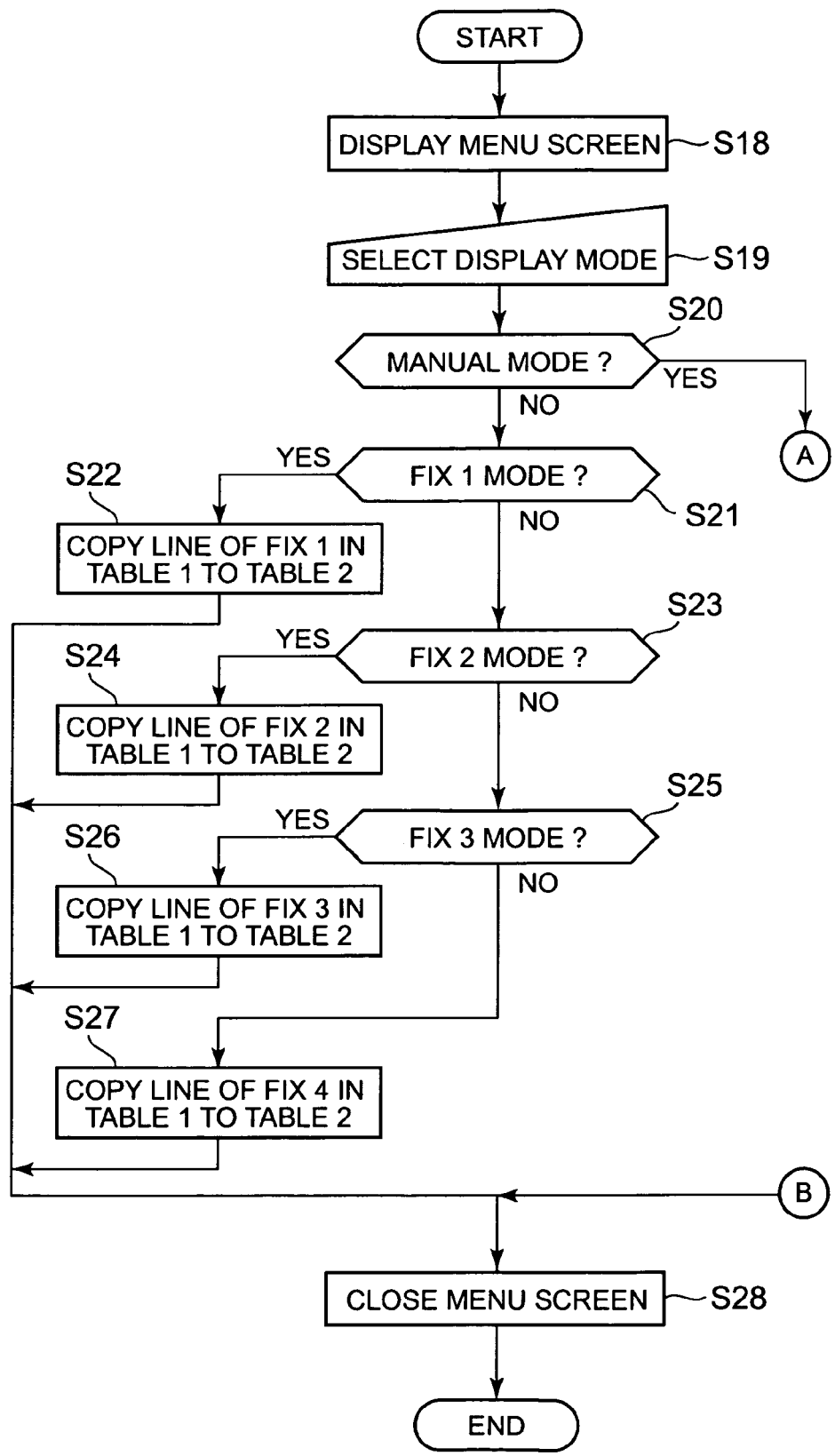

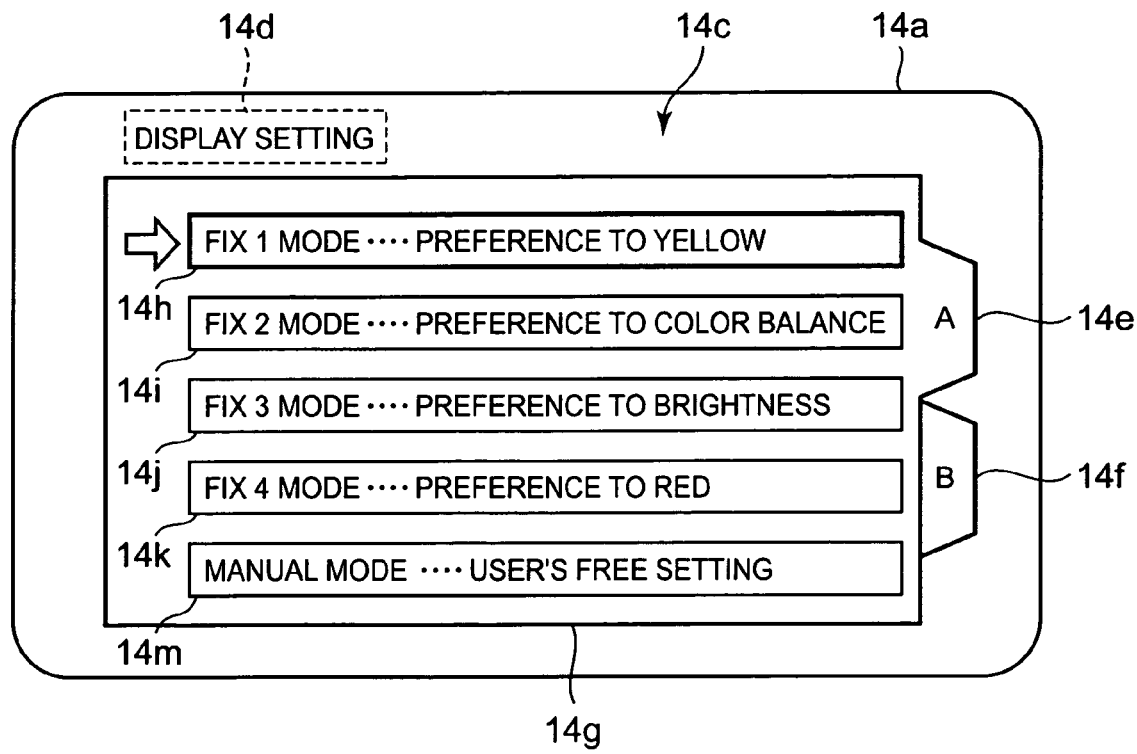
FIG. 22

FIG. 23A
TABLE 1
| N | ITEM | m | 1 | | | | m | 2 | | | | m | 6 | | | |
|---|---|---|---|---|---|---|---|---|---|---|---|---|---|---|---|---|
| | | | a | b | c | d | | a | b | c | d | | a | b | c | d |
| | FIX 1 L1 | [A] | a' | b' | c' | d' | [B] | . | . | . | . | [B] | . | . | . | . |
| | FIX 2 L2 | [B] | a" | b" | c" | d" | [A] | . | . | . | . | [A] | . | . | . | . |
| | FIX 3 L3 | [A] | . | . | . | . | [A] | . | . | . | . | [A] | . | . | . | . |
| | FIX 4 L4 | [A] | . | . | . | . | [A] | . | . | . | . | [A] | . | . | . | . |
| | MANUAL L5 | [A] | . | . | . | . | [B] | . | . | . | . | [B] | . | . | . | . |
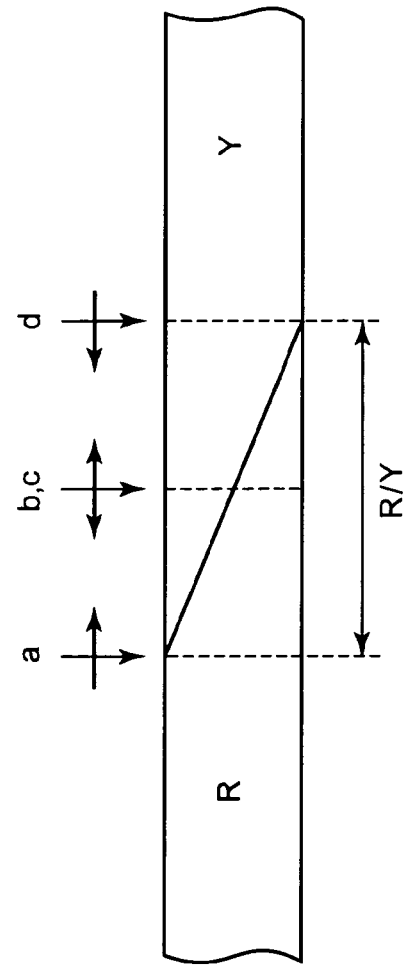
FIG. 23B

FIG. 24

| TABLE 2 | | | | | | | | | | | | | | |
|---|---|---|---|---|---|---|---|---|---|---|---|---|---|---|
| N | | 1 | | | | | 2 | | | | | 6 | | |
| ITEM | m | a | b | c | d | m | a | b | c | d | m | a | b | c | d |
| CURRENT SETTING L1 | [A] | ... | ... | ... | ... | [B] | ... | ... | ... | ... | [B] | ... | ... | ... | ... |

FIG. 25
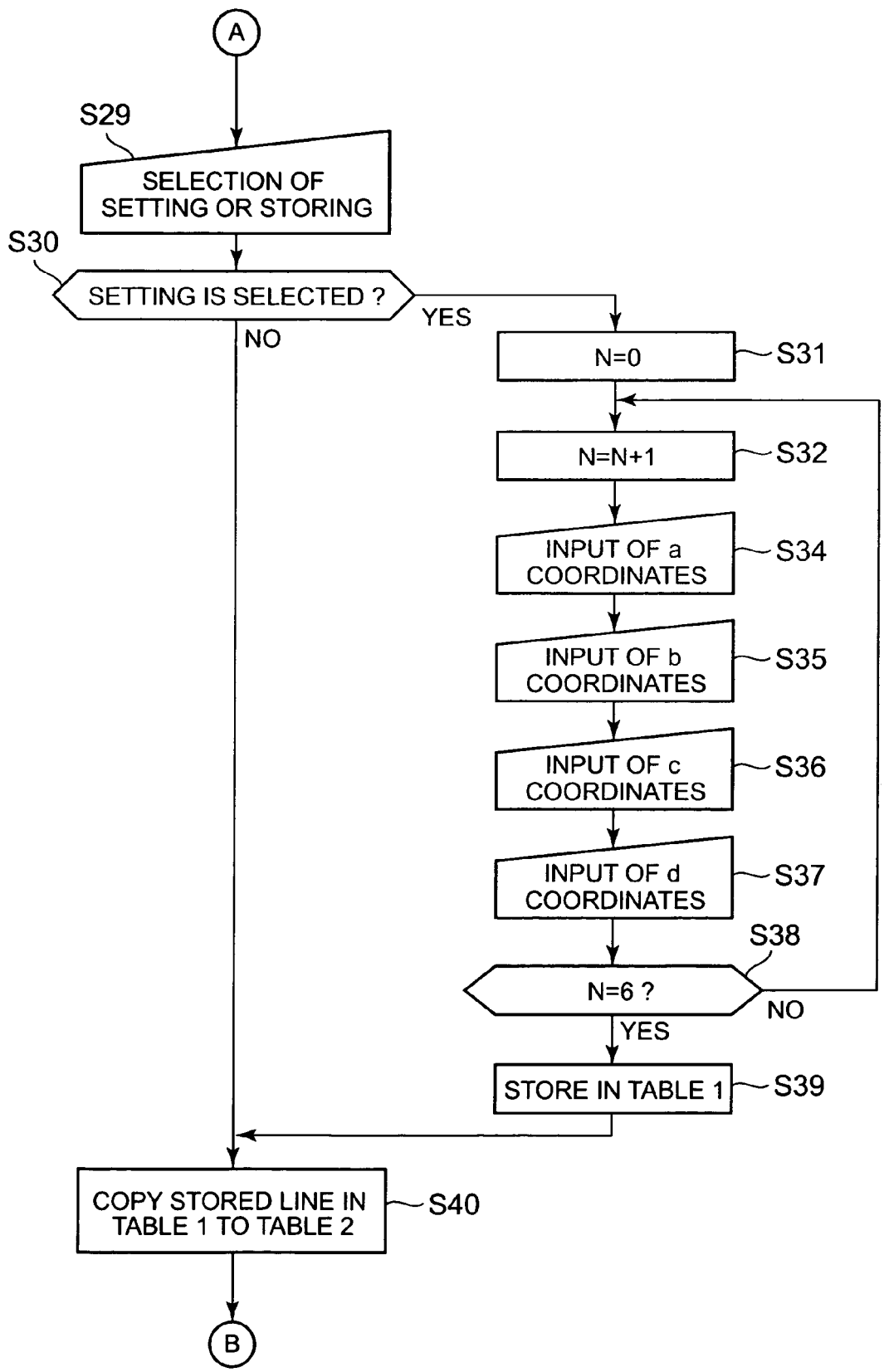

FIG. 26
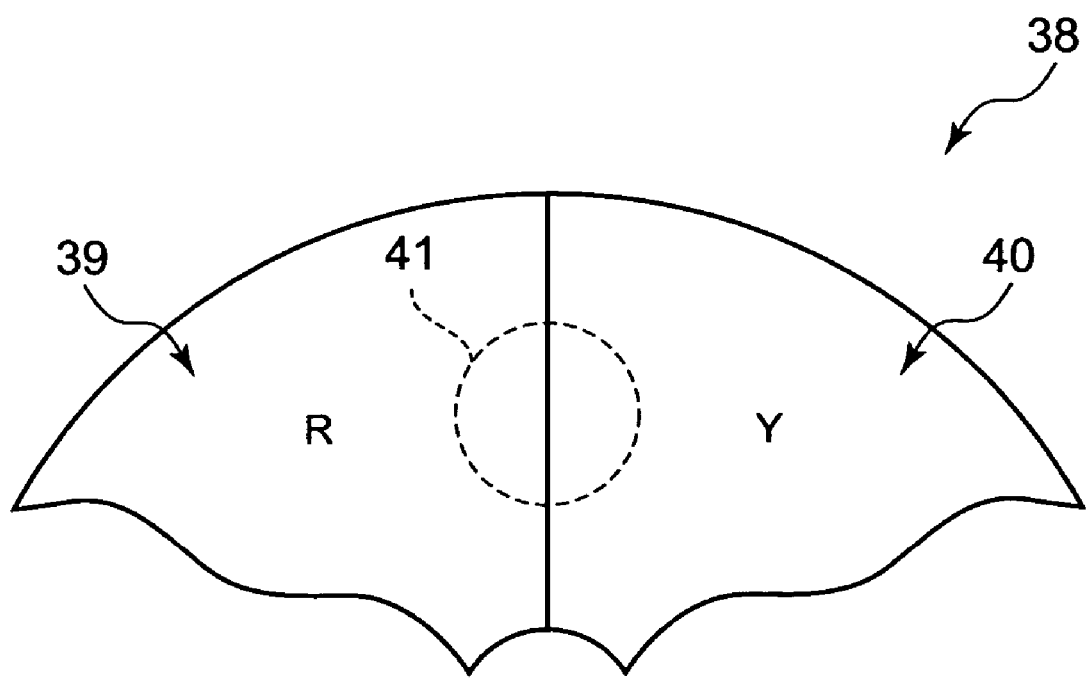

FIG. 27A
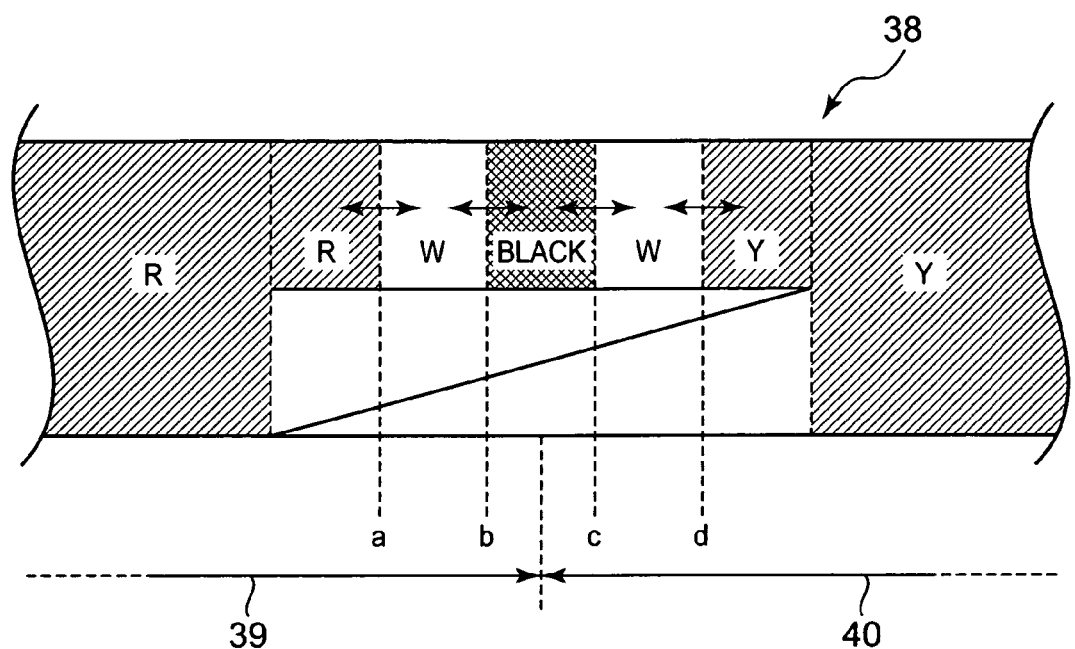
FIG. 27B
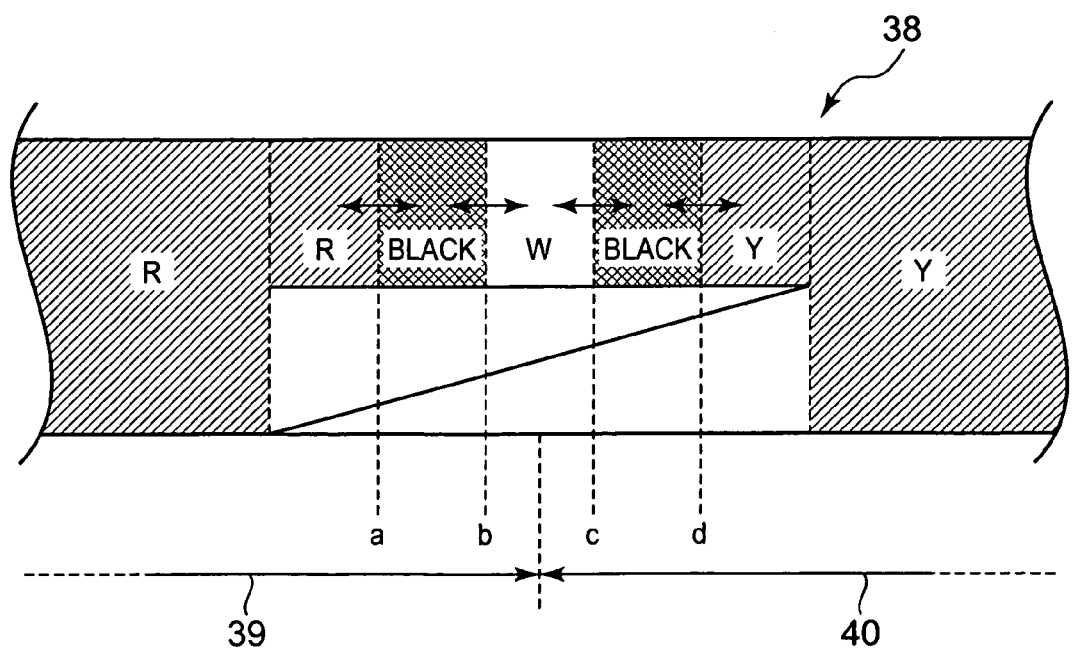

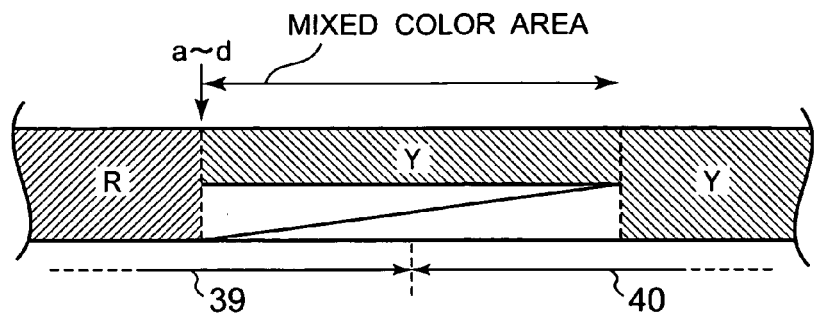
FIG. 28A
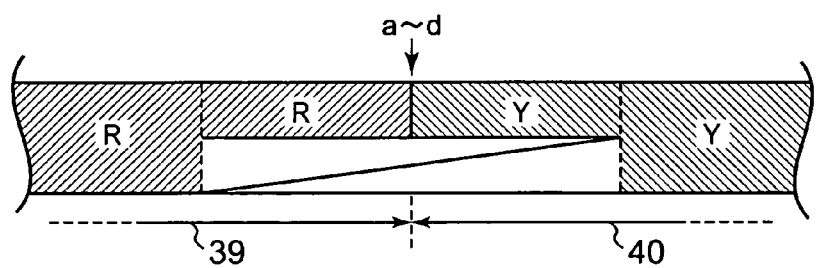
FIG. 28B
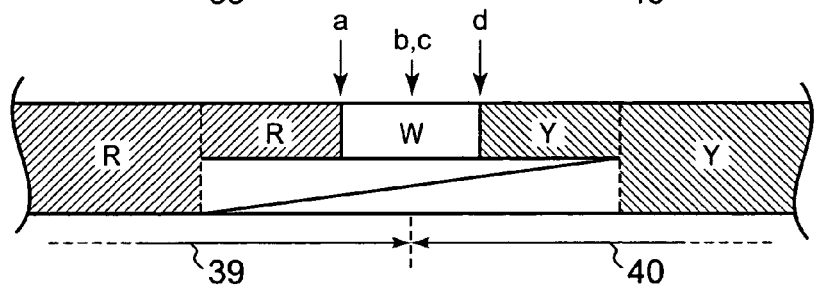
FIG. 28C
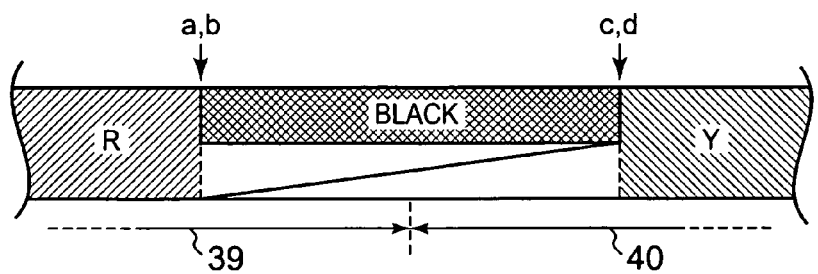
FIG. 28D
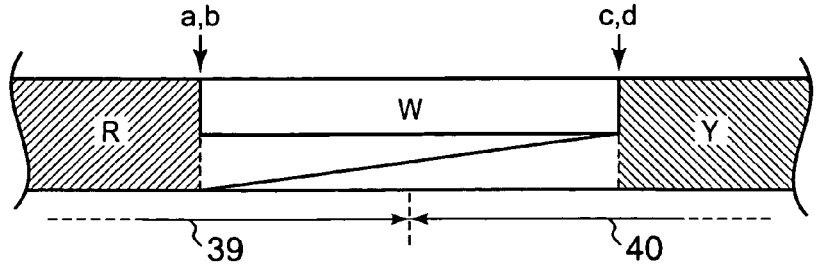
FIG. 28E

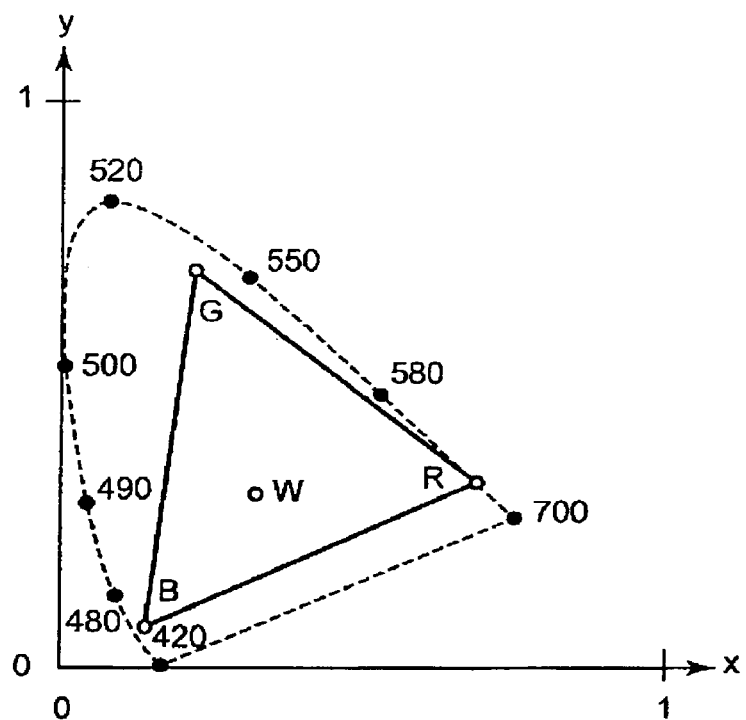
PRIOR ART
FIG. 29

PRIOR ART
FIG. 30A
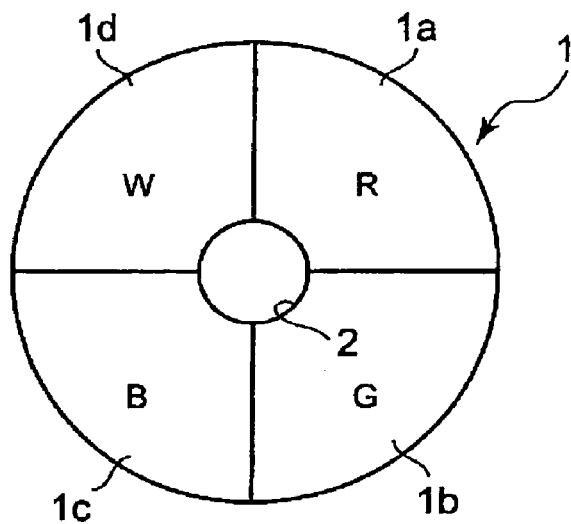
PRIOR ART
FIG. 30B
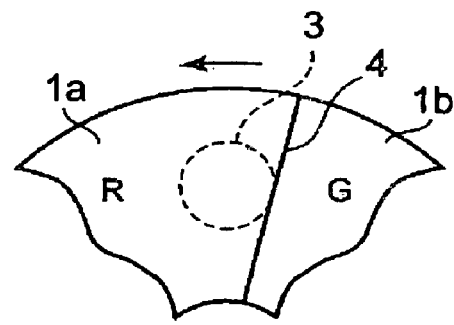
PRIOR ART
FIG. 30C
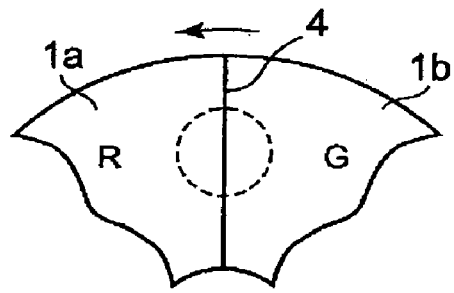
PRIOR ART
FIG. 30D
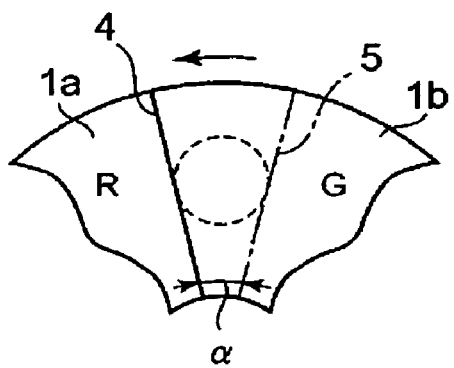

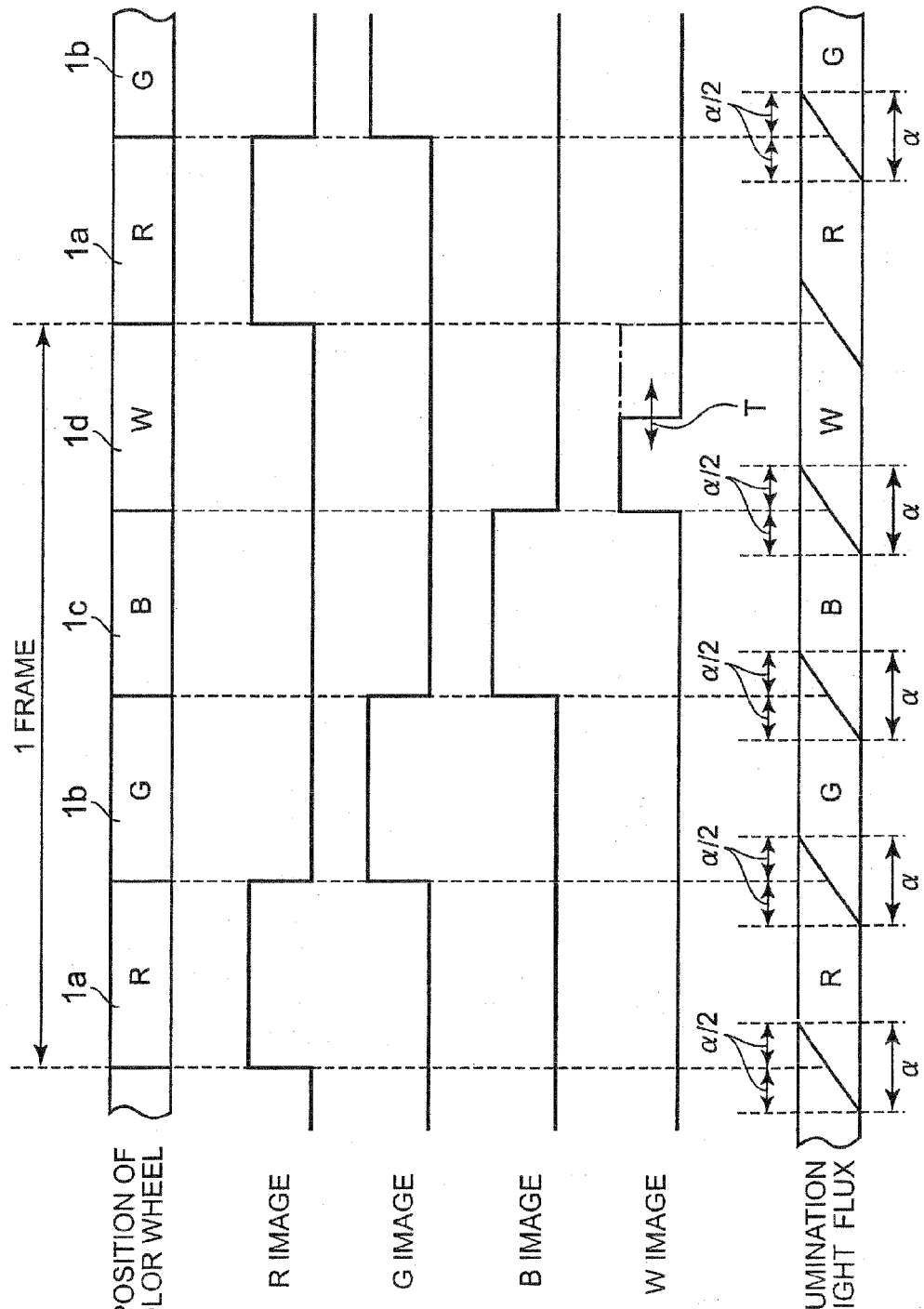

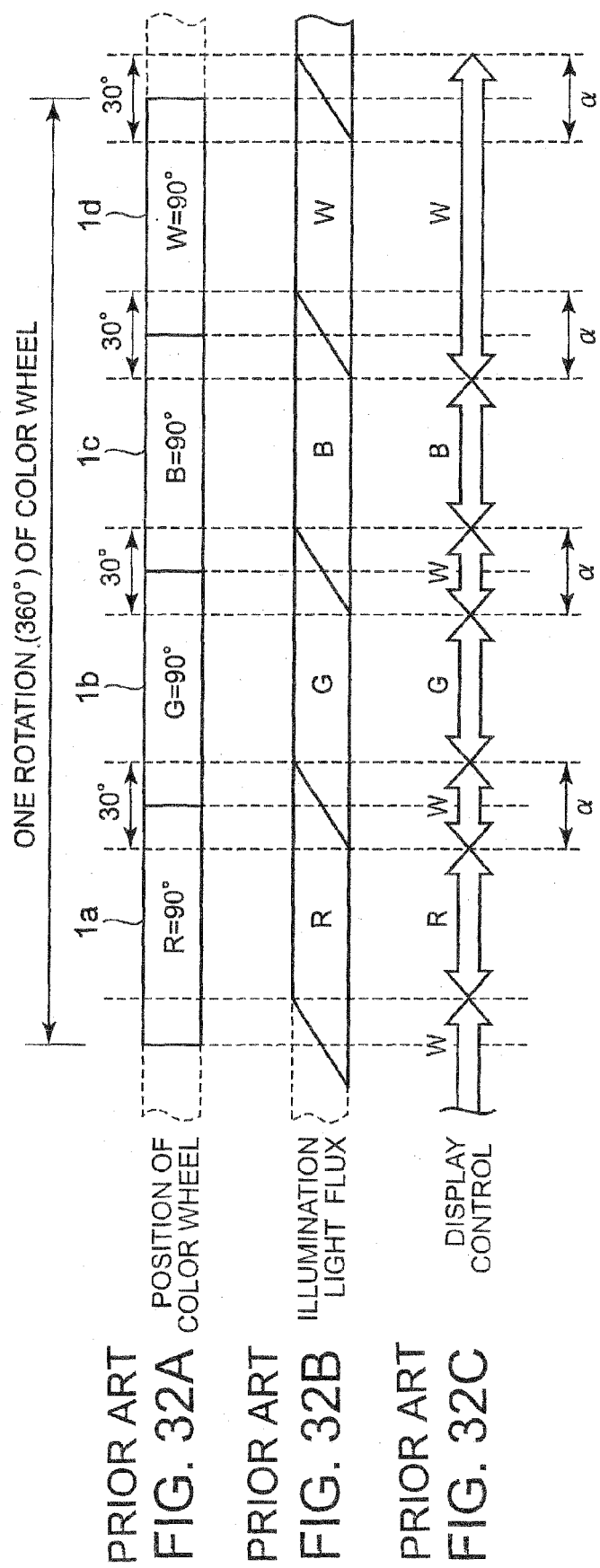
PRIOR ART
FIG. 32A
PRIOR ART
FIG. 32B
PRIOR ART
FIG. 32C

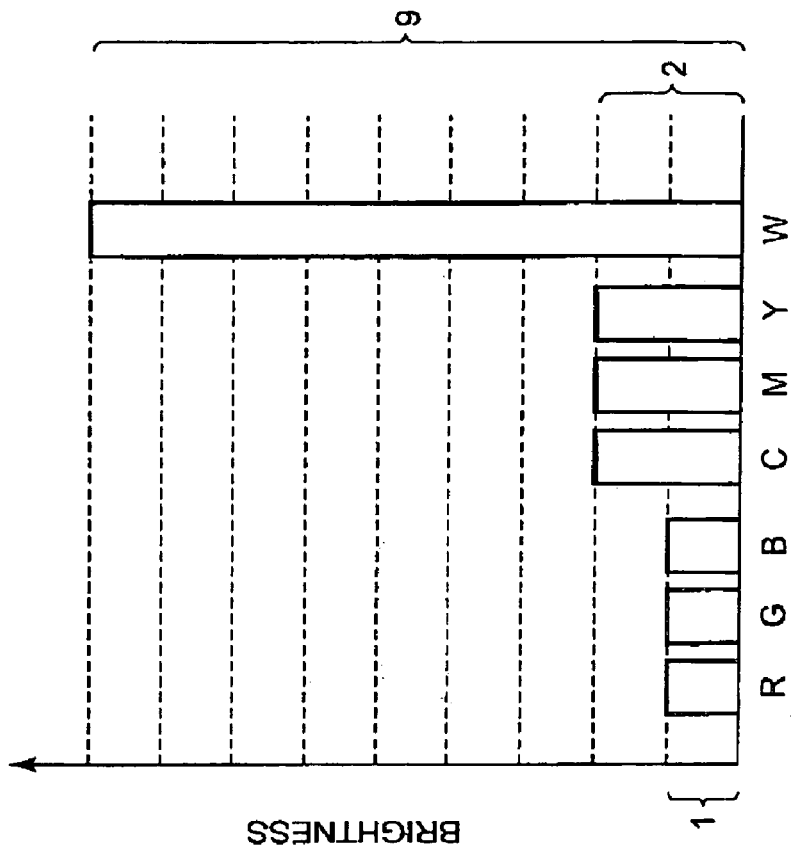
PRIOR ART
FIG. 33A
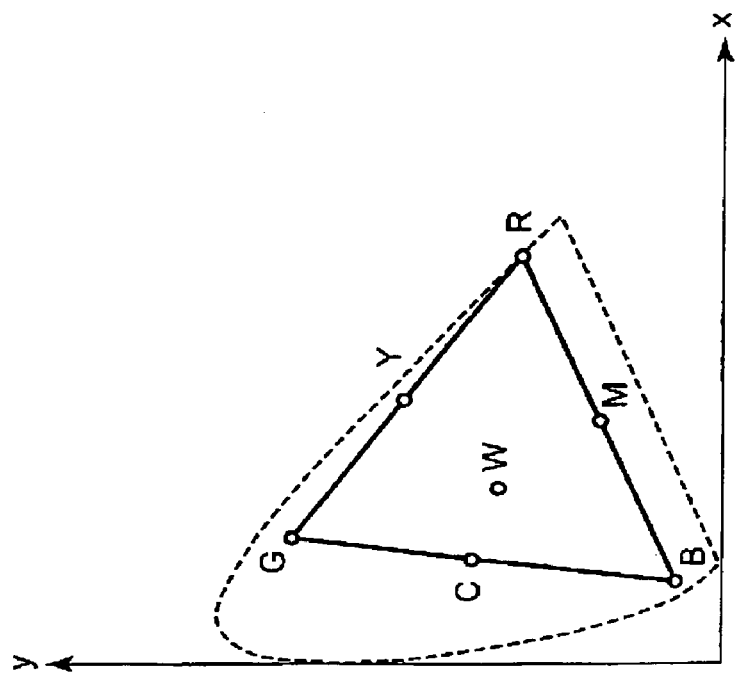
PRIOR ART
FIG. 33B

PROJECTION DISPLAY APPARATUS HAVING IMAGE MODULATION TIMING CHANGING FUNCTION

BACKGROUND OF THE INVENTION

1. Field of the Invention

The present invention relates to a projection display apparatus such as a projector, etc., and a display control method thereof, and more particularly relates to a projection display apparatus for projecting a color image on a screen in expansion and a display control method thereof.

2. Description of the Related Art

The colors we see everyday are categorized into two types, namely, the colors of objects (object colors) expressed by pigments, paints, etc., and the colors of light (illuminant colors) expressed by light's three primary colors on a display screen such as a projection display apparatus, a television receiver, a personal computer display, etc.

One of the differences between the object colors and the illuminant colors is the combinations of the primary colors. The primary colors of the object colors are the three of magenta (abbreviated as M), yellow (abbreviated as Y), and cyan (abbreviated as C). As compared with this, the primary colors of the illuminant colors are the three of blue (abbreviated as B), green (abbreviated as G), and red (abbreviated as R). Though blue among the primary colors of the illuminant colors is not strictly pure blue but violet-blue, this will be called "blue" throughout herein for easier understanding. That is, the three primary colors of the illuminant colors are "red (R)", "green (G)", and "blue (B)".

Another difference between the object colors and the illuminant colors is how the colors appear when the primary colors are mixed (color blending effects). That is, in case of the object colors, since more light is absorbed as more colors are blended, the amount of light reflected reduces subtractively, gradually making the color subdued. This is called subtractive color mixing. In contrast, in case of the illuminant colors, color blending directly leads to an increase of the amount of light, making the color more and more vivid. This is called additive color mixing.

A display apparatus such as a projection display apparatus makes up a display image with multiple pixels constituted by dots of the light's three primary colors. The display apparatus expresses various colors by increasing or reducing the brightness of each dot while utilizing the above-described "additive color mixing".

While one senses the colors subjectively, the colors can be represented by three measures of hue, brightness, and saturation. These are called three attributes of color. The hue indicates the differences in colors, i.e., the same things as we daily perceive or name as "colors" such as red, green, blue, etc. The brightness indicates the brilliance of colors. The brightest color is white and the darkest color is black. The saturation is how the color is vivid. As the saturation lowers, the color becomes subdued and colorless, while as the saturation increases, the color becomes garish.

FIG. 29 is a CIE chromaticity diagram (particularly, a CIE xy chromaticity diagram taking x and y coordinate axes) established by the International Commission on Illumination (CIE). This chromaticity diagram represents the schematized three attributes of color, where the broken line shaped like a sail of a yacht is the trajectory of the visible light spectrum (from about 380 nm to 780 nm). All existing colors can be distributed within this spectrum trajectory. The trajectory has some black dots for expediency, with the values besides the black dots indicating the wavelength (420 nm, 480 nm, . . . , 700 nm) of the colors on the x-y coordinates. These values have no particular meaning, but are merely indicated as examples.

The triangle drawn within the spectrum trajectory is the range in which a color CRT (Cathode Ray Tube) reproduces colors. As the area of the triangle increases, more colors can be reproduced. The vertices of the triangle represents the chromatic coordinates of red (R), green (G), and blue (B). The "W" positioned almost at the center of the triangle represents the standard illuminant color (white). Colors closer to W have lower "chromaticity". The "chromaticity" means the color, which is independent from the brightness among the elements we consider to be associated with colors. In many cases, the chromaticity is divided into "hue" and "saturation".

As obvious from the above, the CIE xy chromaticity diagram can represent the chromaticity, i.e., "hue" and "saturation" of all the colors by x-y coordinates. The "brightness" among the three attributes of colors can be represented by another axis (z axis). That is, this CIE xy chromaticity diagram shows one cross-sectional surface of a three-dimensional figure extending in the back and forth direction of the drawing, as sliced along a direction perpendicular to the z axis, which means that the position at which the z axis is perpendicularly crossed, i.e., at which the slicing takes place, represents the brightness. The origin on the z axis represents zero brightness, and the dynamic range of the brightness broadens as the three-dimensional figure gets higher.

With such basic knowledge about color informed, a conventional projection display apparatus (hereinafter referred to as conventional apparatus) will be explained (for example, see Unexamined Japanese Patent Application KOKAI Publication No. 2004-45989).

FIG. 30A is a structure diagram of a color wheel used in the conventional apparatus. The color wheel is an optical device for dividing a white light into the light's three primary colors on the temporal axis. While the basic color wheel has three areas corresponding to RGB, a color wheel that has a transmission area for a white light (W) in addition to the RGB areas is shown here. That is, the illustrated color wheel 1 is constituted by a glass disk in which a motor shaft attaching portion 2 is opened at the center, and which is radially quadrisected by 90 degrees each to provide a red spectrum area (R area 1a), a green spectrum area (G area 1b), a blue spectrum area (B area 1c), and a white light transmission area (W area 1d).

The color wheel 1 is rotatably driven by an unillustrated motor. While the color wheel 1 is rotated, a white spotlight 3 from an unillustrated light source is irradiated on an arbitrary portion on a concentric circle of the color wheel 1.

The size of the spotlight 3 is sufficiently smaller than the size of the R area 1a, the G area 1b, the B area 1c, and the W area 1d. Therefore, with the rotational direction of the color wheel 1 assumed as the counterclockwise direction with respect to the drawing, when the spotlight 3 is irradiated on the R area 1a, a red light is emitted from the color wheel 1. When the spotlight 3 is irradiated on the G area 1b, a green light is emitted from the color wheel 1. When the spotlight 3 is irradiated on the B area 1c, a blue light is emitted from the color wheel 1. Further, when the spotlight 3 is irradiated on the W area 1d, a white light is emitted from the color wheel 1.

FIGS. 30B to D show how the spotlight 3 goes across a boundary 4 between the areas (hereinafter referred to as transboundary state). As will be explained in detail later, in this transboundary state, the spotlight 3 shifts from a state as shown in FIG. 30B where it is irradiated on a single area (the R area 1a in the drawing), undergoes a state as shown in FIG. 30C where it straddles over two areas (the R area 1a and the G area 1b in the drawing), and reaches a state as shown in FIG. 30D where it again is irradiated on a signal area (the G area 1b in the drawing), as the color wheel 1 is rotated.

Thus, in the transboundary state, color mixing is obtained between the two spectrum areas (the R area 1a and the G area 1b in the drawing, also called segment) that adjoin the boundary 4. The ratio of color mixing changes in accordance with the distribution of the area of the spotlight 3 between the respective areas onto which the spotlight 3 is irradiated. That is, as the state shifts from FIG. 30B (first spectrum area, provisionally) to FIG. 30C (second spectrum area, provisionally), the ratio of green included in red gradually increases, making the initially red color yellowish stepwise. Then, the ratio of red and green is balanced to produce substantially pure yellow when the state comes exact to FIG. 30C. Further, as the state shifts from FIG. 30C to FIG. 30D, the ratio of red included in green gradually decreases, changing the substantially pure yellow to gradually wear a greenish hue and eventually be infinitely close to green.

The duration time of the state of FIG. 30C in the transboundary state, i.e., the duration time of the color mixing increases in proportion to the diameter of the spotlight 3, i.e., an angle α at which the left and right external tangents 4 and 5 of the spotlight 3 shown in FIG. 30D cross each other at the rotational center of the color wheel 1. For example, in a case where the angle α is 30 degrees, the color mixing (for example, red→yellow→green) continues while the spotlight 3 is irradiated on the ranges of 15 degrees ahead and rear of the boundary 4 between the two areas, i.e., the range of the angle α (=30 degrees).

FIGS. 31A to 31F are timing charts showing the timings to drive the color wheel of the conventional apparatus. In FIGS. 31B to 31E, the R image, the G image, the B image, and the W image are image signals supplied, as time-divided, to a light modulation device (see a later-described DMD 34: FIG. 2). The R image is an image signal of R components extracted from a frame image of RGB, the G image is an image signal of G components extracted from the same frame image, the B image is an image signal of B components extracted from the same frame image, and the W image is an image signal for an image to be displayed fully white (a luminance image as an image signal comprising only luminance information may replace the W image).

A color image can be displayed on a screen by sequentially supplying the R image, the G image, the B image, and the W image to the light modulation device in synchronization with the rotational positions (the respective positions of the R area 1a, the G area 1b, the B area 1c, and the W area 1d) of the color wheel 1 as shown in FIG. 31, and irradiating a light flux made up of the red, green, blue, and white modulated lights as modulated according to these images onto the screen from the projection display apparatus.

Here, the projection display apparatus has two typical use styles: one that puts a high value on the color reproductivity such as for home theater, and the other where the brightness is important such as for presentation. In the case where the color reproductivity is highly valued, the color purity of the R area 1a, the G area 1b, and the B area 1c of the color wheel 1 may be increased, so that each color may be as close to the primary color as possible. However, this in turn decreases the light transmissivity, and the brightness cannot be secured. Thus, the presentation use cannot be satisfied in this case. Contrarily, if the transmissivity of the R area 1a, the G area 1b, and the B area 1c of the color wheel 1 is increased or the transmissivity of the color wheel 1 as a whole is increased by preparing the W area or in other manners in order to obtain a sufficient brightness, the color purity is lost and the home theater use thus cannot be fulfilled. The brightness can also be secured by increasing the amount of light from the light source, but this entails a limit in terms of heat generation and power consumption.

As demanded by these backgrounds, the illustrated conventional apparatus is made capable of varying the drive time of the W image (or the luminance image). That is, as shown by an arrow T in FIG. 31E, the drive time of the W image is increased for securing the brightness, while the drive time of the W image is shortened for securing the color reproductivity, so that the above-described two uses are both met.

The prior art fails to explain the period during which the spotlight 3 crosses the boundary 4 between two areas (the period of the above-described transboundary state), i.e., the period of the 15 degree (α/2) ranges prior and posterior to the spotlight 3 crossing the boundary between the R area 1a and the G area 1b and the boundary between the G area 1b and the B area 1c. If the W image is driven during this period, it can be considered that the brightness can further be increased.

FIGS. 32A to 32C are timing charts showing the timings to drive the color wheel in a case where the W image is driven also in the transboundary state. As shown in FIGS. 32A to 32C, the drive time of the W image includes not only the W area 1d of the color wheel 1 but also the 15-degree (=α/2) ranges at the front and the back of the boundaries between the areas, i.e., the 15-degree ranges at the front and the back of the boundary between the R area 1a and the G area 1b, the 15-degree ranges at the front and the back of the boundary between the G area 1b and the B area 1c, the 15-degree ranges at the front and the back of the boundary between the B area 1c and the W area 1d, and the 15-degree ranges at the front and the back of the boundary between the W area 1d and the R area 1a. The total drive time of the W image equals the angle of the W area 1d+3α=90 degrees+30 degrees+30 degrees+30 degrees, resulting in that the W image can be driven for as long a time as 180 degrees corresponding to about the half round of the color wheel 1, contributing to further increasing the brightness.

It is good for the above-described conventional apparatus if the white image is driven for such a long time as 180 degrees corresponding to about the half round of the color wheel 1, because the brightness can be further increased. However, on the other hand, since only W becomes prominently large, its balance with R, G, B, and their complementary colors (C, M, Y) is destroyed and the white portions will be heavily emphasized, giving rise to a problem that the colors in the projected image will be subdued.

FIGS. 33A and 33B are the CIE xy chromaticity diagram of the conventional apparatus, and a conceptual diagram of the brightness of each image. In the CIE xy chromaticity diagram, the vertices of the triangle represents the chromatic coordinates of red (R), green (G), and blue (B), likewise the foregoing CIE xy chromaticity diagram. C (cyan) is the complementary color of R, M (magenta) is the complementary color of G, and Y (yellow) is the complementary color of B.

When the respective images of R, G, B, C, M, Y, and W are compared in terms of brightness, it will roughly be a ratio of "R:G:B:C:M:Y:W=1:1:1:2:2:2:9" as shown in FIG. 33B. This is because the W image is driven for such a long time as 180 degrees corresponding to about the half round of the color wheel 1 as described above.

It is generally said that the proper ratio among R, G, B, C, M, Y, and W is about "1:1:1:2:2:2:3", where R, G, and B with respect to C, M, and Y is about "1:2", and R, G, and B with respect to W is about "1:3". It is believed that an ideal balance between the color and the brightness can be achieved at this ratio. Thus, the ratio of the conventional apparatus greatly diverges from this balance, and the colors it produces therefore seem subdued.

As described above, the above-described conventional apparatus is effective in a point that the brightness can be increased, but has a problem that it cannot make subtle adjustments, for example, emphasizing a specific color, focusing on color shading, balancing color shade and color purity, or giving preference to color purity, etc., i.e., minute adjustments that relate to man's subjectivity.

Hence, an object of the present invention is to provide a projection display apparatus and a display control method thereof, which can flexibly adapt to a wide range of demands from brightness preference to color reproductivity preference, by making the driving pattern of the color wheel variously changeable with respect to each area and each image.

SUMMARY OF THE INVENTION

According to one aspect of the present invention, a projection display apparatus is structured to comprise: a light source which emits a spotlight having a white color; a color wheel on which a plurality of transmission areas having different light transmission characteristics are arranged in a direction of its circumference; a modulation unit which modulates the spotlight based on image data in a mixed-color period in which, along with a rotation of the color wheel, the spotlight from the light source passes through the color wheel at a boundary between a first transmission area and a second transmission area adjoining each other and having different transmission characteristics; and a timing change unit which changes a timing at which image data based on which the spotlight is modulated is switched to another one.

According to another aspect of the present invention, there is provided a control method of a projection display apparatus, which comprises: a light source for emitting a spotlight having a white color; and a color wheel on which a plurality of transmission areas having different light transmission characteristics are arranged in a direction of its circumference, and the control method comprises: a modulating step of modulating the spotlight based on image data in a mixed-color period in which, along with a rotation of the color wheel, the spotlight from the light source passes through the color wheel at a boundary between a first transmission area and a second transmission area adjoining each other and having different transmission characteristics; and a timing changing step of changing a timing at which image data based on which the spotlight is modulated is switched to another one.

According to another aspect of the present invention, there is provided a program for controlling a computer comprising: a light source for emitting a spotlight having a white color; and a color wheel on which a plurality of transmission areas having different light transmission characteristics are arranged in a direction of its circumference, to function as: a modulation unit which modulates the spotlight based on image data in a mixed-color period in which, along with a rotation of the color wheel, the spotlight from the light source passes through the color wheel at a boundary between a first transmission area and a second transmission area adjoining each other and having different transmission characteristics; and a timing change unit which changes a timing at which image data based on which the spotlight is modulated is switched to another one.

According to another aspect of the present invention, a projection display apparatus is structured to comprise: a light source which emits a spotlight having a white color; a color wheel on which a plurality of transmission areas having different light transmission characteristics are arranged in a direction of its circumference; modulation means for modulating the spotlight based on image data in a mixed-color period in which, along with a rotation of the color wheel, the spotlight from the light source passes through the color wheel at a boundary between a first transmission area and a second transmission area adjoining each other and having different transmission characteristics; and timing change means for changing a timing at which image data based on which the spotlight is modulated is switched to another one.

BRIEF DESCRIPTION OF THE DRAWINGS

These objects and other objects and advantages of the present invention will become more apparent upon reading of the following detailed description and the accompanying drawings in which:

FIG. 1 is a diagram showing an outer view of a projector 10;

FIG. 2 is a block diagram showing the interior of the projector 10;

FIG. 3A is a front elevation of a color wheel 31, FIG. 3B is a diagram exemplarily showing a positional relationship between a color wheel rotation angle sensor 33 and the color wheel 31, and FIG. 3C is a diagram showing the waveform of a rotation angle detection signal CP;

FIG. 4A to FIG. 4F are diagrams showing the spectrum characteristic of each area of the color wheel 31;

FIG. 5 is a diagram showing a relationship between a spotlight Pa irradiated from a light source 30 and the color wheel 31;

FIG. 6A to FIG. 6C are diagrams showing rotational states of the color wheel 31 (1/3);

FIG. 7A to FIG. 7C are diagrams showing rotational states of the color wheel 31 (2/3);

FIG. 8A to FIG. 8C are diagrams showing rotational states of the color wheel 31 (3/3);

FIG. 9 is a diagram showing correspondence between changes of the rotation angle of the color wheel 31 and the light color emitted from the color wheel 31;

FIG. 10 is a diagram showing a schematic flowchart of control program executed by a central control unit 22 of the projector 10 according the first embodiment;

FIG. 11 is a diagram showing a flowchart of a first display control mode process according to the first embodiment;

FIG. 12 is a diagram showing a flowchart of a second display control mode process according to the first embodiment;

FIG. 13 is a diagram showing a flowchart of a third display control mode process according to the first embodiment;

FIG. 14 is a diagram showing a flowchart of a fourth display control mode process according to the first embodiment;

FIG. 15A to FIG. 15F are diagrams showing conceptual time sequences of the first to fourth display control modes according to the first embodiment;

FIG. 16A is a CIE xy chromaticity diagram of the first display control mode according to the first embodiment, and FIG. 16B is a conceptual diagram of the brightness of each image;

FIG. 17A is a CIE xy chromaticity diagram of the second display control mode according to the first embodiment, and FIG. 17B is a conceptual diagram of the brightness of each image;

FIG. 18A is a CIE xy chromaticity diagram of the third display control mode according to the first embodiment, and FIG. 18B is a conceptual diagram of the brightness of each image;

FIG. 19A is a CIE xy chromaticity diagram of the fourth display control mode according to the first embodiment, and FIG. 19B is a conceptual diagram of the brightness of each image;

FIG. 20 is a comparative diagram of the first to fourth display control modes according to the first embodiment;

FIG. 21 is a diagram showing a schematic flowchart of a control program according to a second embodiment (1/2);

FIG. 22 is a diagram showing an example of the layout of a menu screen for making selection from a plurality of display control modes;

FIG. 23A is a conceptual structure diagram of a table 1 and FIG. 23B is a conceptual diagram of values stored in small classification columns of "a", "b", "c", and "d";

FIG. 24 is a conceptual structure diagram of a table 2;

FIG. 25 is a diagram showing a schematic flowchart of the control program according to the second embodiment (2/2);

FIG. 26 is a structure diagram of a color wheel used in a third embodiment;

FIG. 27A and FIG. 27B are diagrams showing drive timings of the color wheel 38;

FIG. 28A to FIG. 28E are diagrams showing some examples of adjustment results according to the third embodiment;

FIG. 29 is a CIE chromaticity diagram;

FIG. 30A is a structure diagram of a color wheel used in the conventional apparatus, and FIG. 30B to FIG. 30D are diagrams showing the state where a spotlight 3 crosses a boundary 4 between areas;

FIG. 31A to FIG. 31F are diagrams showing driving timings of the color wheel of the conventional apparatus;

FIG. 32A to FIG. 32C are diagrams showing driving timings of the color wheel in a case where a W image is driven also in the transboundary state; and FIG. 33A is a CIE xy chromaticity diagram of the conventional apparatus, and FIG. 33B is a conceptual diagram of the brightness of each image.

DETAILED DESCRIPTION OF THE PREFERRED EMBODIMENTS

An embodiment of the present invention will be explained with reference to the drawings, by employing a projector as an example. Note that various specifications for details, examples, values, character strings, symbols, etc. to appear in the following explanation are merely indicated as reference for clarifying the concept of the present invention, and it is apparent that the concept of the present invention is not limited by all or some of these. For example, in the present embodiment, light modulation is performed by using a DMD (Digital Micro-mirror Device), but it may be performed by using other devices such as a liquid crystal, a GLV (Grating Light Valve), etc. Detailed explanation for known methods, known manners, known architectures, known circuit structures, etc. (hereinafter referred to as "known matters") will be omitted, but this is merely for making the explanation concise, and not to intentionally exclude all or part of the known matters. Since these known matters have been known by those skilled in the art at the time of filing of the present application, these matters are naturally included in the following explanation.

FIG. 1 is an external view of a projector 10 as a projection display apparatus. The projector 10 has a housing 11 having a shape (a rectangular parallelepiped in the drawing) devised with an arbitrary design. A projection lens 13 hidden behind a lens cover 12 is provided on the front surface of the housing 11 of the projector 10. The lens cover 12 is normally at the position shown in the drawing and hides (protects) the projection lens 13, but the projection lens 13 is exposed to have an unillustrated screen within its view when the lens cover 12 is manually slid.

The projection lens 3 is for projecting an optical image formed by a later-described DMD 34. The projection lens 13 can arbitrarily change its focus and projection magnification (zoom).

A device operation display section 14, an upper cover 15, and a speaker 16 are provided on the upper surface of the housing 11. The device operation display section 14 comprises a plane display device (a liquid crystal display panel, an organic display panel, an EL (electroluminescence) display panel, etc.) with a touch panel. The device operation display section 14 graphically displays various operation buttons necessary for each operational situation, and generates an event signal corresponding to a touching operation, when the touching operation is made upon a button. Further, when an operational aberration happens, the device operation display section 14 displays the content of the happening by a character string, a figure, etc.

The speaker 16 amplifies and outputs audio information included in an image or arbitrary presentation software, when the image is projected or the presentation software is executed.

Device sub keys 17, which are usually hidden and unseen are provided under the upper cover 15. When a minute operational setting is made by other than operations upon the buttons displayed on the device operation display section 14, the upper cover 15 is opened and these device sub keys 17 are operated.

FIG. 2 is an internal block diagram of the projector 10. The projector 10 comprises blocks of the speaker 16, an audio processing unit 18, a display drive unit 19, the device operation display section 14 (a plane display device 14a, a touch panel 14b), an operation unit 20 including the device sub keys 17, a storage unit 21, a central control unit 22 (image signal selection means, color display control mode selection means, timing change means), an input/output connector 23, an input/output I/F 24, an image conversion unit 25, a video RAM 26 (including at least an R image plane 26a, a G image plane 26b, and a B image plane 26c), a projection encoder 27, a projection drive unit 28 (time division drive means), a reflector 29, a light source 30, a color wheel 31 (color division means), a color wheel drive motor 32, a color wheel rotation angle sensor 33, a DMD 34 (modulation means), the projection lens 13 (projection means), a focus/zoom drive motor 36, a cooling fan 37, a cooling fan drive motor 38, etc.

The storage unit 21 is a non-volatile and rewritable storage element comprising a storage device such as a semiconductor memory, a magnetic disk, etc. The storage unit 21 stores various software resources (basic software, control program, data, etc.) necessary for the central control unit 22 to operate.

The central control unit 22 graphically displays required operation buttons, etc. on the plane display device 14a of the device operation display section 14 via the display drive unit 19. When a user touches an arbitrary operation button, the coordinates of the touched portion is detected on the touch panel 14b and the central control unit 22 specifies the type of the button touched based on the detected coordinates and performs a control mode (for example, a projection condition setting mode for setting the focus, the zoom, etc.) corresponding to the specified result.

The central control unit 22 selects a corresponding terminal (RCA terminal) of the input/output connector 23 by controlling the input/output I/F 24, in a case where an input image has a resolution of XGA (1024×768 pixels) to thereby require the RCA terminal among the terminals of the input/output connector 23, and includes audios. Then, the central control unit 22 takes in the input image and audios from the external device attached to the terminal, and transfers these to the image conversion unit 25 and the audio processing unit 18.

The central control unit 22 displays a selection screen for making selection from a plurality of display control modes on the plane display device 14a of the device operation display section 14 via the display drive unit 19. When the user selects an appropriate one by touching the display control mode selection screen in accordance with his/her purpose at that time, the coordinates of the touched portion are detected on the touch panel 14b and the central control unit 22 specifies the touched display control mode based on the detected coordinates. Then, the central control unit 22 performs the display control mode corresponding to the specified result. The details of the selection and performance of the display control mode will be described later.

The central control unit 22 includes a timing change unit 221. The timing change unit 221 changes a timing at which image data based on which a spotlight Pa is modulated is switched to another one.

The audio processing unit 18 amplifies audios and outputs them from the speaker 16 in the amplified level. The image conversion unit 25 converts the input image into a predetermined format, and transmits the converted image to the projection encoder 27.

The projection encoder 27 expands and stores the transmitted image signal on each image plane in the video RAM 26 (an R image signal→the R image plane 26a, a G image signal→the G image plane 26b, and a B image signal→the B image plane 26c). Then, the projection encoder 27 sequentially reads out the image signals (the R image signal, the G image signal, and the B image signal) stored on each image plane in the video RAM 26, and transmits them to the projection drive unit 28.

The projection drive unit 28 transmits the R image signal, the G image signal, and the B image signal transmitted from the projection encoder 27 to the DMD 34 so that the DMD 34 may be driven by each of these image signals, and receives a signal from the color wheel rotation angle sensor 33 and sends a control signal to the color wheel drive motor 32 so that the color wheel 31 may be rotated in synchronization with the transmission of the image signals to the DMD 34. As a result, the rotation of the color wheel 31 is controlled such that a spotlight Pa irradiates an R area of the color wheel 31 when the DMD 34 is driven by the R image signal, the spotlight Pa irradiates a G area of the color wheel 31 when the DMD 34 is driven by the G image signal, and the spotlight Pa irradiates a B area of the color wheel 31 when the DMD 34 is driven by the B image signal.

The DMD 34 may be driven by CMY image signals. In this case, the projection drive unit 28 generates CMY image signals from the RGB image signals transmitted, and drives the DMD 34 by the generated CMY image signals.

Further, the DMD 34 may be driven by an image signal (W image signal) which will make the full display screen appear white. In this case, the projection drive unit 28 drives the DMD 34 by an image signal having a constant luminance over the full screen, regardless of the RGB image signals The DMD 34 may be driven by an image signal (black image signal) which will make the full display screen appear black. In this case, the projection drive unit 28 drives the DMD 34 by an image signal having a zero luminance over the full screen, regardless of the RGB image signals.

The DMD 34 may be driven by a luminance image signal which will represent the brightness of the display. In this case, the projection drive unit 28 generates a luminance image signal from the RGB image signals transmitted from the projection encoder 27, and drives the DMD 34 by the generated luminance image signal. A luminance image signal $I_{ij}$, which corresponds to a pixel whose coordinate position in the displayed image is i on the x axis and j on the y axis, is calculated by the following equation (1).

$$I_{ij} = I_{Rij} W_R + I_{Gij} W_G + I_{Bij} W_B \quad (1)$$

In the above-described equation (1), $I_{Rij}$, $I_{Gij}$, and $I_{Bij}$ represent the signal intensity of the RGB image signals corresponding to the pixel whose coordinate position in the displayed image is i on the x axis and j on the y axis. Further, $W_R$, $W_G$, and $W_B$ represent constants for obtaining the intensity of the luminance image signal from the signal intensities of the RGB image signals. The projection drive unit 28 calculates a luminance image signal according to the equation (1) for every pixel in the image to be displayed, and drives the DMD 34 by the calculated luminance image signals.

The DMD (Digital Micro-mirror Device) 34 is a semiconductor-integrated optical switch comprising multiple minute movable mirrors laid over a plane. The size of the movable mirrors is, for example, ten and several μm angle, and the mirrors are attached on a support such that their inclination may be changed by about ±10 degrees between when they are on and when they are off. A memory element is formed right under the movable mirrors, and the movable mirrors are switched on or off in accordance with a positive field effect of the memory element. The amount of light reflected by the DMD 34 reaches the maximum (white gradation) when the movable mirrors are switched on, and the minimum (black gradation) when the movable mirrors are switched off. Further, since the switching speed (on/off switching speed) of each movable mirror can be set to five hundred thousand times per second, the amount of light reflection of the DMD 34 may be set to a half gradation (gray scale) by varying the switching ratio of the respective mirrors.

When a white spotlight Pa having a high luminance is irradiated onto this DMD 34 from the light source 30 such as an ultrahigh pressure mercury lamp or the like arranged inside the reflector 29, its reflection light Pb appear as light-modulated (light-modulated pixel by pixel based on the content of the image signal) in accordance with the on/off of each mirror of the DMD 34 and its switching ratio. By this reflection light Pb being projected on the unillustrated screen via the projection lens 13, an expanded image of the image signal can be projected on the screen.

Note that since the number of the DMD 34 is one in the illustrated example and the spotlight Pa irradiated from the light source 30 is a white light, only a monochrome image can be projected on the screen in this case. Hence, actually, the color wheel 31 is put in front of the light source 30 and the color wheel drive motor 32 rotationally drives the color wheel 31, and besides, the image signals are expanded and stored in the video RAM 26 on the basis of image signal component by component corresponding to the light's three primary colors (RGB) when the image signals are to be stored in the video RAM 26.

FIG. 3A is a front elevation of the color wheel 31. The color wheel 31 of the present embodiment is, but not limited to, of a sextuple structure. That is, the color wheel 31 comprises a disk plate on which an R area 31a, a G area 31b, and a B area 31c are formed, and an M (magenta=R+B) area 31d, a C (cyan=G+B) area 31e, and a Y (yellow=R+G) area 31f are formed between these areas. The angles of the R area 31a, the G area 31b, and the B area 31c are the same (for example, 90 degrees), and the angles of the M area 31d, the C area 31e, and the Y area 31f are the same (but smaller than the angles of the R area 31a, the G area 31b, and the B area 31c, and, for example, 30 degrees).

These angles are roughly determined in accordance with the size of the hot spot of the light that passes through the color wheel 31. For example, since the present embodiment shows a case where the angle corresponding to the size of the hot spot is 30 degrees, the angles of the CMY areas are 30 degrees. With this configuration, the time-divisional color assignment on the light from the light source 30 through this color wheel 31 will achieve a fine time division balance between RGB and CMY, as will be explained later with reference to FIGS. 15A to F, especially when this color assignment is controlled in a third display control mode process P3 and a fourth display control mode process P4 which will be described later.

The display control method is not limited to the later-described four control mode processes (P1 to P4) but has room for adjustment case by case. However, even in a case where the hot spot is the minimum (≈0 degree), it is normally obviously improper that the size of the CMY areas be larger than the size of the RGB areas, because the color balance will be poor. Further, it is normally necessary to make the hot spot have a substantial size, because if the hot spot is minimum-sized, the light is likely to thermally break the color wheel 31 when passing through the color wheel 31 due to it gaining a very high temperature. Judging from this and in view of the color balance, it is normally appropriate to size the CMY areas to be apparently smaller than the RGB areas.

The size of the areas that make up the color wheel 31 may not be the same among the primary colors (RGB) or among their complementary colors (CMY). For example, in adjusting the hue, the R area may be larger-sized than the G and B areas, depending on the case. With this adjustment, totally a reddish image will be displayed.

That is, in a case where a medium color between primary colors are arranged between the primary colors, the center angle of the filter of the medium color is made apparently smaller than the center angles of the primary color filters on both sides of the medium color filter.

A circular opening 31h is formed at the center of the plate constituting the color wheel 31, for attaching the shaft of the color wheel drive motor 32. A small hole 31j, which indicates the reference position for detecting the rotation angle of the color wheel 31, is formed in this color wheel 31, at a predetermined position near the circumferential edge of the plate (in the drawing, the position deviated by 15 degrees clockwise from a boundary 31i between the R area and the M area).

FIG. 3B exemplarily shows the positional relationship between the color wheel rotation angle sensor 33 and the color wheel 31.

The color wheel rotation angle sensor 33 comprises a squared-U-shaped body 33c having built-in light emitting unit 33a and light receiving unit 33b. The color wheel rotation angle sensor 33 sandwiches a near-edge-portion of the plate of the color wheel 31 by its body 33c with no contact with that portion, receives a light from the light emitting unit 33a by the light receiving unit 33b, and outputs a rotation angle detection signal CP corresponding to the presence or absence of the light.

The rotation angle detection signal CP is maintained at a low level while the light from the light emitting element 33a is blocked by the plate, but rises to a high level when the light from the light emitting element 33a passes through the small hole 31j. Since the color wheel 31 is rotationally driven by the color wheel drive motor 32 at a predetermined relatively high speed, the light from the light emitting element 33a is allowed only an instant to pass through the small hole 31j in the plate. Therefore, the rotation angle detection signal CP instantly rises to the high level once in each rotation of the color wheel 31. Accordingly, with the rotation angle at the time of the rise to the high level assumed as 0 degree, the rotation angle (0 to 360 degrees) of the color wheel 31 that changes instant by instant can be represented by a period from one high level to another high level, as shown in FIG. 3C.

While the condition of the color wheel 31 is detected by the color wheel rotation angle sensor 33 in this manner, the color wheel 31 is rotationally driven by the color wheel drive motor 32 so as to be synchronous with the driving of the DMD 34. Generally, the projection drive unit 28 receives the rotation angle detection signal CP from the color wheel rotation angle sensor 33, and sends a rotation drive signal to the color wheel drive motor 32 such that the rotation of the color wheel 31 will be synchronous with the driving of the DMD 34.

FIGS. 4A to F are diagrams showing the spectrum characteristics of the respective areas of the color wheel 31. FIG. 4A shows the spectrum characteristic of the R area 31a, FIG. 4B shows the spectrum characteristic of the G area 31b, FIG. 4C shows the spectrum characteristic of the B area 31c, FIG. 4D shows the spectrum characteristic of the Y area 31f, FIG. 4E shows the spectrum characteristic of the C area 31e, and the FIG. 4F shows the spectrum characteristic of the M area 31d. In these diagrams, the vertical axis represents the transmission strength of the light, and the horizontal axis represents the wavelength of the light. The wavelength of a green light is shorter than the wavelength of a red light, and the wavelength of a blue light is shorter than the wavelength of a green light. The three areas (R, G, B) separated by broken lines in the drawings show expedient ranges of wavelength of a red light, a green light, and a blue light. The spectrum characteristic of the red light can be achieved by increasing the transmissivity of the R area 31a, as shown in FIG. 4A. Likewise, the spectrum characteristic of the green light can be achieved by increasing the transmissivity of the G area 31b as shown in FIG. 4B, and the spectrum characteristic of the blue light can be achieved by increasing the transmissivity of the B area 31c as shown in FIG. 4C.

Yellow (Y) is a mixed color of red (R) and green (G). Therefore, the spectrum characteristic of yellow can be achieved by increasing the transmissivity of the R area 31a and the G area 31b (in other words, by reducing the transmissivity of the B area 31c), as shown in FIG. 4D. Cyan (C) is a mixed color of green (G) and blue (B). Therefore, the spectrum characteristic of cyan can be achieved by increasing the transmissivity of the B area 31c and the G area 31b (in other words, by reducing the transmissivity of the R area 31a), as shown in FIG. 4E. Further, magenta (M) is a mixed color of red (R) and blue (B). Therefore, the spectrum characteristic of magenta can be achieved by increasing the transmissivity of the B area 31c and the R area 31a (in other words, by reducing the transmissivity of the G area 31b), as shown in FIG. 4F.

FIG. 5 is a diagram showing a relationship between the spotlight Pa (hot spot) irradiated from the light source 30 and the color wheel 31. In this diagram, the light axis P of the spotlight Pa is fixed at a predetermined position on a radius of the color wheel 31, and the spotlight Pa relatively moves in the circumferential direction of the color wheel 31, along with the rotation of the color wheel 31.

Here, the diameter of the spotlight Pa is set such that, when external tangents La and Lb on the left and right of the spotlight Pa are crossed at the rotational center O of the color wheel 31, the crossing angle θ at which the tangents cross each other is the same as the angle (30 degrees) of each of the Y area 31f, the C area 31e, and the M area 31d formed on the color wheel 31. Since θ=30 degrees, the diameter of the spotlight Pa is given by "2×OA×(tan(θ/2))". OA is the distance from the rotational center O of the color wheel 31 to the point of contact A of the external tangent La to the spotlight Pa. For example, in a case where it is assumed that OA=10 mm, the angle (30 degrees) of each of the Y area 31f, the C area 31e, and the M area 31d formed on the color wheel 31 can be made the same as the crossing angle θ if the diameter of the spotlight Pa is set to 5.36 mm based on the foregoing formula.

FIG. 6A to FIG. 6C, FIG. 7A to FIG. 7C, and FIG. 8A to FIG. 8C are diagrams showing the rotational states of the color wheel 31. FIG. 6A is a diagram showing the state when the rotation angle of the color wheel 31 is 0 degree. FIG. 6B is a diagram showing the state when the rotation angle is 60 degrees. FIG. 6C is a diagram showing the state when the rotation angle is 90 degrees. FIG. 7A is a diagram showing the state when the rotation angle is 120 degrees. FIG. 7B is a diagram showing the state when the rotation angle is 180 degrees. FIG. 7C is a diagram showing the state when the rotation angle is 210 degrees. FIG. 8A is a diagram showing the state when the rotation angle is 240 degrees. FIG. 8B is a diagram showing the state when the rotation angle is 300 degrees. FIG. 8C is a diagram showing the state when the rotation angle is 330 degrees.

Among these states of the rotation angle, the state when the angle is 0 degree is when the small hole 31j formed in the color wheel 31 is at the position of the color wheel rotation angle sensor 33. When the color wheel 31 is rotated counterclockwise from this reference rotation angle (0 degree), the rotation angle gradually gains and again comes to 0 degree when the color wheel 31 have made one turn. Thereafter, this shift of rotation angle is repeated.

When the color wheel 31 is at any of the aforementioned rotation angles (0 degree, 60 degrees, 90 degrees, 120 degrees, 180 degrees, 210 degrees, 240 degrees, 300 degrees, and 330 degrees), the spotlight Pa is within a single spectrum area. Therefore, the light color of each of the spectrum areas is emitted from the color wheel 31.

That is, in a case where the rotation angle is 0 degree and 60 degrees (or within 0 degree to 60 degrees) (see FIGS. 6A and 6B), the spotlight Pa is positioned within the R area 31a, thereby a red (R) light color is emitted from the color wheel 31. In a case where the rotation angle is 90 degrees (see FIG. 6C), the spotlight Pa is positioned within the Y area 31f, thereby a yellow (Y) light color is emitted from the color wheel 31. Likewise, in a case where the rotation angle is 120 degrees and 180 degrees (or within 120 degrees to 180 degrees) (see FIGS. 7A and 7B), the spotlight Pa is positioned within the G area 31b, thereby a green (G) light color is emitted from the color wheel 31. In a case where the rotation angle is 210 degrees (see FIG. 7C), the spotlight Pa is positioned within the C area 31e, thereby a cyan (C) light color is emitted from the color wheel 31. Likewise, in a case where the rotation angle is 240 degrees and 300 degrees (or within 240 degrees to 300 degrees) (see FIGS. 8A and 8B), the spotlight Pa is positioned within the B area 31c, thereby a blue (B) light color is emitted from the color wheel 31. In a case where the rotation angle is 330 degrees (see FIG. 8C), the spotlight Pa is positioned within the M area 31d, thereby a magenta (M) light color is emitted from the color wheel 31.

On the other hand, when the spotlight Pa crosses the boundary between spectrum areas of the color wheel 31, a light color having mixed colors from the two bordering spectrum areas is emitted from the color wheel 31. That is, in a case where the rotation angle of the color wheel 31 is in a range that is larger than 60 degrees (see FIG. 6B) and smaller than 90 degrees (see FIG. 6C), a mixed color (R/Y) that gradually changes from red to yellow is emitted from the color wheel 31. In a case where the rotation angle of the color wheel 31 is in a range that is larger than 90 degrees (see FIG. 6C) and smaller than 120 degrees (see FIG. 7A), a mixed color (Y/G) that gradually changes from yellow to green is emitted from the color wheel 31. In a case where the rotation angle of the color wheel 31 is in a range that is larger than 180 degree (see FIG. 7B) and smaller than 210 degrees (see FIG. 7C), a mixed color (G/C) that gradually changes from green to cyan is emitted from the color wheel 31. In a case where the rotation angle of the color wheel 31 is in a range that is larger than 210 degrees (see FIG. 7C) and smaller than 240 degrees (see FIG. 8A), a mixed color (C/B) that gradually changes from cyan to blue is emitted from the color wheel 31. In a case where the rotation angle of the color wheel 31 is in a range that is larger than 300 degrees (see FIG. 8B) and smaller than 330 degrees (see FIG. 8C), a mixed color (B/M) that gradually changes from blue to magenta is emitted from the color wheel 31. In a case where the rotation angle of the color wheel 31 is in a range that is larger than 330 degrees (see FIG. 8C) and smaller than 0 degrees (see FIG. 6A), a mixed color (M/R) that gradually changes from magenta to red is emitted from the color wheel 31.

FIG. 9 is a diagram showing a relation of association between the changes of the rotation angle of the color wheel 31 and the light color emitted fro the color wheel 31. The reference rotation angle (0 degree) of the color wheel 31 is synchronous with the timing at which the rotation angle detection signal CP instantly rises to the high level. Since when the rotation angle of the color wheel 31 is at the reference rotation angle (0 degree), it is immediately after the spotlight Pa gets out from the M area 31d as shown in FIG. 6A, the spotlight Pa irradiates the R area 31a by its whole body. Accordingly, when the rotation angle is 0 degree, the light color emitted from the color wheel 31 is pure "red (R)", which is a transmission light having passed through the R area 31a.

When the rotation angle of the color wheel 31 is 0 degree to 60 degrees, the spotlight Pa has not yet come inside the Y area 31f as shown in FIG. 6B, thus still irradiates the R area 31a by its whole body. Accordingly, when the rotation angle is 0 degree to 60 degrees, the light color emitted from the color wheel 31 is also pure "red (R)", which is a transmission light having passed through the R area 31a.

When the rotation angle of the color wheel 31 is larger than 60 degrees and smaller than 90 degrees, the spotlight Pa straddles the R area 31a and the Y area 31f (crosses the boundary), thus irradiates these two areas (the R area 31a and the Y area 31f) by its whole body. Accordingly, when the rotation angle is larger than 60 degrees and smaller than 90 degrees, the light color emitted from the color wheel 31 is a "mixed color (R/Y) of red and yellow", which is a transmission light having passed through the R area 31a and the Y area 31f simultaneously.

When the rotation angle of the color wheel 31 is 90 degrees, the spotlight Pa has completely entered the Y area 31f as shown in FIG. 6C, thus irradiates the Y area 31f by its whole body. Accordingly, when the rotation angle is 90 degrees, the light color emitted from the color wheel 31 is pure "yellow (Y)", which is a transmission light having passed through the Y area 31f.

When the rotation angle of the color wheel 31 is larger than 90 degrees and smaller than 120 degrees, the spotlight Pa straddles the Y area 31f and the G area 31b (crosses the boundary), thus irradiates these two areas (the Y area 31f and the G area 31b) by its whole body. Accordingly, when the rotation angle is larger than 90 degrees and smaller than 120 degrees, the light color emitted from the color wheel 31 is a "mixed color (Y/G) of yellow and green", which is a transmission light having passed through the Y area 31f and the G area 31b simultaneously.

When the rotation angle of the color wheel 31 is 120 degrees, it is immediately after the spotlight Pa gets out from the Y area 31f as shown in FIG. 7A, thus the spotlight Pa irradiates the G area 31b by its whole body. Accordingly, when the rotation angle is 120 degrees, the light color emitted from the color wheel 31 is pure "green (G)", which is a transmission light having passed through the G area 31b.

When the rotation angle is 120 degrees to 180 degrees, the spotlight Pa has not yet entered the C area 31e as shown in FIG. 7B, thus still irradiates the G area 31b by its whole body. Accordingly, when the rotation angle is 120 degrees to 180 degrees, the light color emitted from the color wheel 31 is pure "green (G)", which is a transmission light having passed through the G area 31b.

When the rotation angle of the color wheel 31 is larger than 180 degrees and smaller than 210 degrees, the spotlight Pa straddles the G area 31b and the C area 31e (crosses the boundary), thus irradiates these two areas (the G area 31b and the C area 31e) by its whole body. Accordingly, when the rotation angle is larger than 180 degrees and smaller than 210 degrees, the light color emitted from the color wheel 31 is a "mixed color (G/C) of green and cyan", which is a transmission light having passed through the G area 31b and the C area 31e simultaneously.

When the rotation angle of the color wheel 31 is 210 degrees, the spotlight Pa has completely entered the C area 31e as shown in FIG. 7C, thus irradiates the C area 31e by its whole body. Accordingly, when the rotation angle is 210 degrees, the light color emitted from the color wheel 31 is pure "cyan (C)", which is a transmission light having passed through the C area 31e.

When the rotation angle of the color wheel 31 is larger than 210 degrees and smaller than 240 degrees, the spotlight Pa straddles the C area 31e and the B area 31c (crosses the boundary), thus irradiates these two areas (the C area 31e and the B area 31c) by its whole body. Accordingly, when the rotation angle is larger than 210 degrees and smaller than 240 degrees, the light color emitted from the color wheel 31 is a "mixed color (C/B) of cyan and blue", which is a transmission light having passed through the C area 31e and the B area 31c simultaneously.

When the rotation angle of the color wheel 31 is 240 degrees, it is immediately after the spotlight Pa gets out from the C area 31e as shown in FIG. 8A, thus the spotlight Pa irradiates the B area 31c by its whole body. Accordingly, when the rotation angle is 240 degrees, the light color emitted from the color wheel 31 is pure "blue (B)", which is a transmission light having passed through the B area 31c.

When the rotation angle of the color wheel 31 is 240 degrees to 300 degrees, the spotlight Pa has not yet entered the M area 31d as shown in FIG. 8B, thus still irradiates the B area 31c by its whole body. Accordingly, when the rotation angle is 240 degrees to 300 degrees, the light color emitted form the color wheel 31 is pure "blue (B)", which is a transmission light having passed through the B area 31c.

When the rotation angle of the color wheel 31 is larger than 300 degrees and smaller than 330 degrees, the spotlight Pa straddles the B area 31c and the M area 31d (crosses the boundary), thus irradiates these two areas (the B area 31c and the M area 31d) by its whole body. Accordingly, when the rotation angle is larger than 300 degrees and smaller than 330 degrees, the light color emitted from the color wheel 31 is a "mixed color (B/M) of blue and magenta", which is a transmission light having passed through the B area 31c and the M area 31d simultaneously.

When the rotation angle of the color wheel 31 is 330 degrees, the spotlight Pa has completely entered the M area 31d as shown in FIG. 8C, thus irradiates the M area 31d by its whole body. Accordingly, when the rotation angle is 330 degrees, the light color emitted from the color wheel 31 is pure "magenta (M)", which is a transmission light having passed through the M area 31d.

When the rotation angle of the color wheel 31 is larger than 330 degrees and smaller than 360 degrees (0 degree), the spotlight Pa straddles the M area 31d and the R area 31a (crosses the boundary), thus irradiates these two areas (M area 31d and the R area 31a) by its whole body. Accordingly, when the rotation angle is larger than 330 degrees and smaller than 360 degrees, the light color emitted from the color wheel 31 is a "mixed color (M/R) of magenta and red", which is a transmission light having passed through the M area 31d and the R area 31a simultaneously.

As described above, the color wheel 31 of the present embodiment can emit a "red color light (R)" when its rotation angle is 0 degrees to 60 degrees, emit a "mixed color light (R/Y) of red and yellow" when its rotation angle is larger than 60 degrees and smaller than 90 degrees, emit a "yellow color light (Y)" when its rotation angle is 90 degrees, emit a "mixed color light (Y/G) of yellow and green" when its rotation angle is larger than 90 degrees and smaller than 120 degrees, emit a "green color light (G)" when its rotation angle is 120 degrees to 180 degrees, emit a "mixed color light (G/C) of green and cyan" when its rotation angle is larger than 180 degrees and smaller than 210 degrees, emit a "cyan color light (C)" when its rotation angle is 210 degrees, emit a "mixed color light (C/B) of cyan and blue" when its rotation angle is larger than 210 degrees and smaller than 240 degrees, emit a "blue color light (B)" when its rotation angle is 240 degrees to 300 degrees, emit a "mixed color light (B/M) of blue and magenta" when its rotation angle is larger than 300 degrees and smaller than 330 degrees, emit a "magenta color light (M)" when its rotation angle is 330 degrees, and emit a "mixed color light (M/R) of magenta and red" when its rotation angle is larger than 330 degrees and smaller than 360 degrees.

In the above description, the color wheel 31 is made up of 30-degree segments (Y are 31f, C area 31e, and M area 31d) and 90-degree segments (R area 31a, G area 31b, and B area 31c). However, this is not the only case. For example, the color wheel 31 may be structured such that the 30-degree segments have a 29-degree range, and the 90-degree segments have a 91-degree range. Furthermore, the color wheel 31 may be structured such that the 30-degree segments have a 40-degree range and the 90-degree segments have an 80-degree range. In this way, by preparing the CMY areas which are smaller than the RGB areas, it is possible to make the projection apparatus better in color reproductivity than by making all the RGBCMY areas the same in size, or by making the CMY areas larger than the RGB areas.

First Embodiment

FIG. 10 is a diagram showing a schematic flowchart of a control program executed by the central control unit 22 of the projector 10. By executing this control program, after carrying out the light source ON (turning on the light source 30)

and the color wheel rotation (activating the color wheel drive motor 32) (step S10), the central control unit 22 performs a display control mode branching process (step S11). As described above, a display control mode is one that is designated by the user by touching a selection button displayed on the plane display device 14a of the device operation display section 14. To be more specific, a display control mode is any of display control modes carried out by one of plural patterns of combination between brightness and saturation (here, 4 patterns for descriptive expediency). Hereinafter, these four display control modes will be referred to as "first display control mode", "second display control mode", "third display control mode", and "fourth display control mode".

The central control unit 22 performs the first display control mode process (step S12) when the "first display control mode" is detected in the branching process at step S11, performs the second display control mode process (step S13) when the "second display control mode" is detected, performs the third display control mode process (step S14) when the "third display control mode" is detected, and performs the fourth display control mode process (step S15) when the "fourth display control mode" is detected.

In any display control mode, the central control unit 22 detects an end of display of an image (step S16) after an image amounting to one frame is displayed, and repeats the branching process at step S11 and the succeeding processes if an end of display has not yet come. On the other hand, if an end of display has come, the central control unit 22 carries out the light source OFF and color wheel stopping (step S17) and terminates the program.

FIG. 11 is a diagram showing the flowchart of the first display control mode process. In this diagram, the central control unit 22 first acquires the rotation angle of the color wheel 31, and sets the value of the acquired rotation angle to a variable CA (step S12a).

Then, the central control unit 22 determines whether or not it is "0 degree<CA<60 degrees" (step S12b). In a case where the determination result is positive (YES), the central control unit 22 drives the DVD 34 by an R image signal read out from the video RAM 26 (step S12c).

Then, the central control unit 22 determines whether or not it is "60 degrees<CA<120 degrees" (step S12d). In a case where the determination result is positive (YES), the central control unit 22 drive the DMD 34 by a W image signal, which is an image signal having a constant intensity over the entire surface of the display screen (step S112e).

Then, the central control unit 22 determines whether or not it is "120 degrees<CA<180 degrees" (step S12f). In a case where the determination result is positive (YES), the central control unit 22 drives the DMD 34 by a G image signal read out from the video RAM 26 (step S12g).

Then, the central control unit 22 determines whether or not it is "180 degrees<CA<240 degrees (step S12h). In a case where the determination result is positive (YES), the central control unit 22 drives the DME 34 by a W image signal, which is an image signal having a constant intensity over the entire surface of the display screen (step S12i).

Then, the central control unit 22 determines whether or not it is "240 degrees<CA<300 degrees" (step S12j). In a case where the determination result is positive (YES), the central control unit 22 drives the DMD 34 by a B image signal read out from the video RAM 26 (step S12k).

Then, the central control unit 22 determines whether or not it is "300 degrees<CA<360 degrees" (step S12m). In a case where the determination result is positive (YES), the central control unit 22 drives DMD 34 by a W image signal, which is an image signal having a constant intensity over the entire surface of the display screen (step S12n).

In the above-described first display control mode, periods in which the DMD 34 is driven by a W image signal are prepared. The DMD 34 may be driven in these periods by a luminance image signal generated based on an R image signal, a G image signal, and a B image signal read out from the video RAM 26 (according to the above-described equation (1)), or by a black image signal, which is an image signal whose luminance is 0 over the entire surface of the display screen. In case of a luminance image signal, the contours in the image become clearer. In case of a black image signal, the color pureness can is improved because unmixed RGB are projected.

FIG. 12 is a diagram showing the flowchart of the second display control mode process. In this diagram, the central control unit 22 first acquires the rotation angle of the color wheel 31, and sets the value of the acquired rotation angle in a variable CA (step S13a).

Then, the central control unit 22 determines whether or not it is "345 degrees<CA<75 degrees" (step S13b). In a case where the determination result is positive (YES), the central control unit 22 drives the DMD 34 by an R image signal read out from the video RAM 26 (step S13c).

Then, the central control unit 22 determines whether or not it is "75 degrees<CA<105 degrees" (step S13d). In a case where the determination result is positive (YES), the central control unit 22 drives the DMD 34 by a Y image signal generated based on an R image signal and a G image signal read out from the video RAM 26 (step S13e).

Then, the central control unit 22 determines whether or not it is "105 degrees<CA<195 degrees" (step S13f). In a case where the determination result is positive (YES), the central control unit 22 drives the DMD 34 by a G image signal read out from the video RAM 26 (step S13g).

Then, the central control unit 22 determines whether or not it is "195 degrees<CA<225 degrees" (step S13h). In a case where the determination result is positive (YES), the central control unit 22 drives the DMD 34 by a C image signal generated based on a G image signal and a B image signal read out from the video RAM 26 (step S13i).

Then, the central control unit 22 determines whether or not it is "225 degrees<CA<315 degrees" (step S13j). In a case where the determination result is positive (YES), the central control unit 22 drives the DMD 34 by a B image signal read out from the video RAM 26 (step S13k).

Then, the central control unit 22 determines whether or not it is "315 degrees<CA<345 degrees" (step S13m). In a case where the determination result is positive (YES), the central control unit 22 drives the DMD 34 by an M image signal generated based on an R image signal and a B image signal read out from the video RAM 26 (step S13n).

FIG. 13 is a diagram showing the flowchart of the third display control mode process. In this diagram, the central control unit 22 first acquires the rotation angle of the color wheel 31, and sets the value of the acquired rotation angle in a variable CA (step S14a).

Then, the central control unit 22 determines whether or not it is "0 degree<CA<60 degrees" (step S14b). In a case where the determination result is positive (YES), the central control unit 22 drives the DMD 34 by an R image signal read out from the video RAM 26 (step S14c).

Then, the central control unit 22 determines whether or not it is "60 degrees<CA<120 degrees" (step S14d). In a case where the determination result is positive (YES), the central control unit 22 drives the DMD 34 by a Y image signal generated based on an R image signal and a G image signal read out from the video RAM 26 (step S14*e*).

Then, the central control unit 22 determines whether or not it is "120 degrees<CA<180 degrees" (step S14*f*). In a case where the determination result is positive (YES), the central control unit 22 drives the DMD 34 by a G image signal read out from the video RAM 26 (step S14*g*).

Then, the central control unit 22 determines whether or not it is "180 degrees<CA<240 degrees" (step S14*h*). In a case where the determination result is positive (YES), the central control unit 22 drives the DMD 34 by a C image signal generated based on a G image signal and a B image signal read out from the video RAM 26 (step S14*i*).

Then, the central control unit 22 determines whether or not it is "240 degrees<CA<300 degrees" (step S14*j*). In a case where the determination result is positive (YES), the central control unit 22 drives the DMD 34 by a B image signal read out from the video RAM 26 (step S14*k*).

Then, the central control unit 22 determines whether or not it is "300 degrees<CA<360 degrees" (step S14*m*). In a case where the determination result is positive (YES), the central control unit 22 drives the DMD 34 by an M image signal generated based on an R image signal and a B image signal read out from the video RAM 26 (step S14*n*).

FIG. 14 is a diagram showing the flowchart of the fourth display control mode process. In this diagram, the central control unit 22 first acquires the rotation angle of the color wheel 31, and sets the value of the acquired rotation angle in a variable CA (step S15*a*).

Then, the central control unit 22 determines whether or not it is "330 degrees<CA<90 degrees" (step S15*b*). In a case where the determination result is positive (YES), the central control unit 22 drives the DMD 34 by an R image signal read out from the video RAM 26 (step S15*c*).

Then, the central control unit 22 determines whether or not it is "90 degrees<CA<210 degrees" (step S15*d*). In a case where the determination result is positive (YES), the central control unit 22 drives the DMD 34 by a G image signal read out form the video RAM 26 (step S15*e*).

Then, the central control unit 22 determines whether or not it is "210 degrees<CA<330 degrees" (step S15*f*). In a case where the determination result is positive (YES), the central control unit 22 drives the DMD 34 by a B image signal read out from the video RAM 26 (step S15*g*).

FIGS. 15A to 15F are conceptual time sequence diagrams of the above-described first display control mode, second display control mode, third display control mode, and fourth display control mode. In these diagrams, FIG. 15A represents the position (rotation angle) of the color wheel 31, and FIG. 15B represents a light flux from lamp emitted from the color wheel 31. FIG. 15C represents the first display control mode P1, FIG. 15D represents the second display control mode P2, FIG. 15E represents the third display control mode P3, and FIG. 15F displays the fourth display control mode P4.

The light flux of lamp is common to all the modes. The color of the light flux of lamp is red (R) when the rotation angle is 0 degrees to 60 degrees, a mixed color (R/Y) of red (R) and yellow (Y) when the rotation angle is larger than 60 degrees and smaller than 90 degrees, yellow (Y) when the rotation angle is 90 degrees, a mixed color (Y/G) of yellow (Y) and green (G) when the rotation angle is larger than 90 degrees and smaller than 120 degrees, green (G) when the rotation angle is 120 degrees to 180 degrees, a mixed color (G/C) of green (G) and cyan (C) when the rotation angle is larger than 180 degrees and smaller than 210 degrees, cyan (C) when the rotation angle is 210 degrees, a mixed color (C/B) of cyan (C) and blue (B) when the rotation angle is larger than 210 degrees and smaller than 240 degrees, blue (B) when the rotation angle is 240 degrees to 300 degrees, a mixed color (B/M) of blue (B) and magenta (M) when the rotation angle is larger than 300 degrees and smaller than 330 degrees, magenta (M) when the rotation angle is 330 degrees, and a mixed color (M/R) of magenta (M) and red (R) when the rotation angle is larger than 330 degrees and smaller than 360 degrees.

The four display control modes (P1 to P4) are different in the drive image signals for the Y area 31*f*, the C area 31*e*, and the M area 31*d*, and their drive time.

First, the first display control mode (P1) will be explained. In this mode, the DMD 34 is driven by an R image signal while the position (rotation angle) of the color wheel 31 is 0 degree to 60 degree. The DMD 34 is driven by a W image signal while the rotation angle is 60 degrees to 120 degrees. The DMD 34 is driven by a G image signal while the rotation angle is 120 degrees to 180 degrees. The DMD 34 is driven by a W image signal while the rotation angle is 180 degrees to 240 degrees. The DMD 34 is driven by a B image signal while the rotation angle is 240 degrees to 300 degrees. The DMD 34 is driven by a W image signal while the rotation angle is 300 degrees to 360 degrees. That is, in the first display control mode (P1), the DMD 34 is driven in the order of R image signal→W image signal→G image signal→W image signal→B image signal→W image signals→ . . . , and the drive time of each W image signal is a time corresponding to 60 degrees in terms of rotation angle.

Next, the second display control mode (P2) will be explained. In this mode, the DMD 34 is driven by an R image signal while the position (rotation angle) of the color wheel 31 is 345 degrees to 75 degrees. The DMD 34 is driven by a Y image signal while the rotation angle is 75 degrees to 105 degrees. The DMD 34 is driven by a G image signal while the rotation angle is 105 degrees to 195 degrees. The DMD 34 is driven by a C image signal while the rotation angle is 195 degrees to 225 degrees. The DMD is driven by a B image signal while the rotation angle is 225 degrees to 315 degrees. The DMD 34 is driven by an M image signal while the rotation angle is 315 degrees to 345 degrees. That is, in the second display control mode (P2), the DMD 34 is driven in the order of R image signal→Y image signal→G image signal→C image signal→B image signal→M image signal→ . . . , and the drive time of each of the Y image signal, the C image signal, and the M image signal is a time corresponding to 30 degrees in terms of rotation angle.

Next, the third display control mode (P3) will be explained. In this mode, the DMD 34 is driven by an R image signal while the position (rotation angle) of the color wheel 31 is 0 degree to 60 degrees. The DMD 34 is driven by a Y image signal while the rotation angle is 60 degrees to 120 degrees. The DMD 34 is driven by a G image signal while the rotation angle is 120 degrees to 180 degrees. The DMD 34 is driven by a C image signal while the rotation angle is 180 degrees to 240 degrees. The DMD 34 is driven by a B image signal while the rotation angle is 240 degrees to 300 degrees. The DMD 34 is driven by an M image signal while the rotation angle is 300 degrees to 360 degrees. That is, in the third display control mode (P3), the DMD 34 is driven in the order of R image signal→Y image signal→G image signal→C image signal→B image signal→M image signal→ . . . , and the driven time of each of the Y image signal, the C image signal, and the M image signal is a time corresponding to 60 degrees in terms of rotation angle.

Next, the fourth display control mode (P4) will be explained. In this mode, the DMD 34 is driven by an R image signal while the position (rotation angle) of the color wheel 31 is 330 degrees to 90 degrees. The DMD 34 is driven by a G image signal while the rotation angle is 90 degrees to 210 degrees. The DMD 34 is driven by a B image signal while the rotation angle is 210 degrees to 330 degrees. That is, in the fourth display control mode (P4), the DMD 34 is driven in the order of R image signal→G image signal→B image signal→ . . . , and the drive time of a W image signal, a Y image signal, a C image signal, and an M image signal is zero.

FIGS. 16A and 16B are a CIE xy chromaticity diagram of the first display control mode (P1), and a conceptual diagram of the brightness of each image. In these diagrams, the size of the triangle in the chromaticity diagram is almost the same as that of the conventional apparatus (see FIG. 33A). Further, the ratio of the brightness among the respective R, G, B, C, M, Y, and W images is "1:1:1:2:2:2:7.5", which is approximately the same as the ratio of the conventional apparatus (see FIG. 33B).

Thus, according to the first display control mode (P1), an image can be achieved which has a brightness and a saturation that are level with those of the prior art.

FIGS. 17A and B are a CIE xy chromaticity diagram of the second display control mode (P2), and a conceptual diagram of the brightness of each image. In these diagrams, the size of the triangle in the chromaticity diagram is slightly smaller than that of the conventional apparatus (see FIG. 33A). Further, the ratio of the brightness among the respective R, G, B, C, M, Y, and W images is "1.8:1.8:1.8:4.2:4.2:4.2:7.5". When the values are rounded off for simplification to make "1.8" "2", "4.2" "4", and "7.5" "8", the ratio is "2:2:2:4:4:4:8", i.e., "1:1:11:2:2:2:4".

Thus, according to the second display control mode (P2), an image can be achieved which has a brightness and a saturation that are balanced, with the saturation slightly poorer than that of the first display control mode (P1).

FIGS. 18A and B are a CIE xy chromaticity diagram of the third display control mode (P3), and a conceptual diagram of the brightness of each image. In these diagrams, the size of the triangle in the chromaticity diagram is almost the same as that of the conventional apparatus (see FIG. 33A). Further, the ratio of the brightness among the respective R, G, B, C, M, Y, and W images is "1:1:1:3.5:3.5:3.5:7.5". When the values are rounded off for simplification to make "3.5" "3" and "7.5" "8", the ratio is "1:1:1:3:3:3:8".

Thus, according to the third display control mode (P3), an image can be achieved which has a brightness and a saturation that are balanced, with the saturation slightly higher than that of the second display control mode (P2).

FIGS. 19A and B are a CIE xy chromaticity diagram of the fourth display control mode (P4), and a conceptual diagram of the brightness of each image. In these diagrams, the size of the triangle in the chromaticity diagram is slightly smaller than that of the conventional apparatus (see FIG. 33A). Further, the ratio of the brightness among the respective R, G, B, C, M, Y, and W images is "2.5:2.5:2.5:6:6:6:7.5". When the values are rounded off for simplification to make "2.5" "3" and "7.5" "8", the ratio is "3:3:3:6:6:6:8", i.e., "1:1:1:2:2:2: 2.6".

Thus, according to the fourth display control mode (P4), an image can be achieved which has a high brightness though being slightly poorer in the saturation than the first to third display control modes (P1 to P3).

FIG. 20 is a comparative diagram of the first display control mode (P1), the second display control mode (P2), the third display control mode (P3), and the fourth display control mode (P4). In this diagram, the vertical axis represents the brightness while the horizontal axis represents the saturation. The data of the prior art shown as a comparative example is high in saturation, therefore suitable for a purpose in which the focus is put on the color reproductivity. The first display control mode (P1) of the present embodiment can achieve a high saturation that is level with that of the prior art.

The second display control mode (P2) of the present embodiment achieves a balance between the brightness and the saturation. The third display control mode (P3) emphasizes the complementary colors. The fourth display control mode (P4) is obviously high in brightness.

Accordingly, in a case where the apparatus is used for a purpose in which the focus is on the color reproductivity, any of the first display control mode (P1), the second display control mode (P2), and the third display control mode (P3) may be selected in accordance with the demand for the color reproductivity. In a case where the apparatus is used for a purpose in which the focus is on the brightness, the fourth display control mode (P4) may be selected.

As described above, the projector 10 according to the present embodiment has a plurality of display control modes (n modes, here n=4) (the first display control mode, the second display control mode, the third display control mode, and the fourth display control mode) that are different in the combination of brightness and saturation. Therefore, a projector 10 can be realized which can be used for both the purposes in which the focus is on the color reproductivity and in which the focus is on the brightness. Besides, since these display control modes include three display control modes (the first display control mode, the second display control mode, and the third display control mode) that are minutely different in brightness and saturation, a display control mode that has the most appropriate color tone matching the image to be projected and the environment can be selected, enabling further minute selections of the color reproductivity.

Second Embodiment

According to the above-described first embodiment, as shown in FIGS. 15A to F, the drive timings of the R image signal, the G image signal, the B image signal, the Y image signal, the C image signal, the M image signal, and the W image signal are varied among the plurality of display control modes, and these drive timings are made synchronous with predetermined rotation angles of the color wheel 31 (0 degree, 60 degrees, 75 degrees, 90 degrees, 105 degrees, 120 degrees, 180 degrees, 195 degrees, 210 degrees, 225 degrees, 240 degrees, 300 degrees, 315 degrees, 330 degrees, and 345 degrees). However, the drive timings are not limited to this. According to the problem to be solved by the present invention, that is, according to the conventional apparatus explained at the beginning of the specification, the problem is that minute adjustments that relate to man's subjectivity, such as emphasizing a specific color, focusing on color shading, balancing color shade and color purity, or giving preference to color purity, etc., cannot be made. Any scheme is employable as long as it can solve this problem.

A second embodiment which relates to such a scheme will be explained below.

FIG. 21 and FIG. 25 are diagrams showing schematic flowcharts of a control program according to the second embodiment. This control program will be executed by the central control unit 22 of the projector 10 likewise the control program for performing the respective display control modes shown in FIGS. 15C to F of the first embodiment.

When the shown control program is started, the central control unit 22 displays a selection screen (hereinafter referred to as a menu screen) for making selection from a plurality of display control modes on the plane display device 14*a* of the device operation display section 14 (step S18).

FIG. 22 is an example layout diagram of the menu screen for making selection from the plurality of display control modes. This menu screen 14*c* comprises a title object 14*d* which is suitably named (in the drawing, "display setting") and a tub control object 14*g* including a plurality (here, two) of tub buttons (an A tub button 14*e* and a B tub button 14*f*). The diagram shows a state that the A tub button 14*e* is selected.

A plurality of button objects 14*h*, 14*i*, 14*j*, 14*k*, and 14*m* are displayed on the tub control object 14*g*. Set as the title property of the button object 14*h* are the name "fix 1 mode" of a control mode corresponding to the button object 14*h*, and a message "preference to yellow" that gives a brief explanation of the control mode. Set as the title property of the button object 14*i* are the name "fix 2 mode" of a control mode corresponding to the button object 14*i* and a message "preference to color balance" that gives a brief explanation of the control mode. Set as the title property of the button object 14*j* are the name "fix 3 mode" of a control mode corresponding to the button object 14*j* and a message "preference to brightness" that gives a brief explanation of the control mode. Set as the title property of the button object 14*k* are the name "fix 4 mode" of a control mode corresponding to the button object 14*k* and a message "preference to red" that gives a brief explanation of the control mode. Set as the title property of the button object 14*m* are the name "manual mode" of a control mode corresponding to the button object 14*m* and a message "user's free setting" that gives a brief explanation of the control mode.

In a case where the B tub button 14*f* is selected, a plurality of button objects are will be displayed likewise. Thus, the user can select a desired one from the plurality of display control modes by switching the A tub button 14*e* and the B tub button 14*f*. In a case where the number of button objects when the B tub button 14*f* is selected is, for example, also five, a desired one can be selected from the total ten display control modes.

Referring back to FIG. 21, when a display control mode is selected by the user (step S19), i.e., when any of the plurality of button objects 14*h*, 14*i*, 14*j*, 14*k*, and 14*m* in FIG. 22 is selected, the central control unit 22 determines whether the selected display control mode is the "manual mode" or not (whether the button object 14*m* is selected or not (step S20). In a case where the selected display control mode is not the "manual mode", the central control unit 22 next determines whether the "fix 1 mode" is selected or not (whether the button object 14*h* is selected or not) (step S21). Then, in a case where the "fix 1 mode" is selected, the central control unit 22 performs a later-described described "copying of the line of fix 1 in the table 1 to the table 2" (step S22), closes the menu screen 14*c* (step S28), and terminates the control program.

In a case where the "fix 1 mode" is not elected, the central control unit 22 next determines whether the "fix 2 mode" is selected or not (whether the button object 14*i* is selected or not) (step S23). Then, in a case where the "fix 2 mode" is selected, the central control unit 22 performs a later-described "copying of the line of fix 2 in the table 1 to the table 2" (step S24), closes the menu screen 14*c* (step S28), and terminates the control program.

In a case where the "fix 2 mode" is not selected, the central control unit 22 next determines whether the "fix 3 mode" is selected or not (whether the button object 14*j* is selected or not) (step S25). Then, in a case where the "fix 3 mode" is selected, the central control unit 22 performs a later-described "copying of the line of fix 3 in the table 1 to the table 2" (step S26), closes the menu screen 14*c* (step S28), and terminates the control program.

Last, in a case where the "fix 3 mode" is not selected, the central control unit 22 determines that the "fix 4 mode" is selected (the button object 14*k* is selected). Then, the central control unit 22 performs a later-described "copying of the line of fix 4 in the table 1 to the table 2" (step S27), closes the menu screen 14*c* (step S28), and terminates the control program.

FIG. 23A is a conceptual structure diagram of the table 1, and FIG. 24 is a conceptual structure diagram of the table 2. These table 1 and table 2 are stored in the storage unit 21 non-volatilely and rewritably.

First, the structure of the table 1 will be explained with reference to FIG. 23A. The table 1 comprises lines L1 to L5 corresponding to the type of the display control modes (fix 1 mode, fix 2 mode, fix 3 mode, fix 4 mode, and manual mode) that are selectable on the menu screen 14*c* of FIG. 22, large classification columns which indicate a number N corresponding to each mixed color area of the color wheel 31 in which the color of transmission light from the hot spot is mixed, and small classification columns of m, a, b, c, and d generated by dividing each large classification column into five. Here, the values of the number N (N=1, N=2, N=3, N=4, N=5, and N=6) corresponding to each mixed color area of the color wheel 31 correspond respectively to mixed color area of the R area 31*a* and the Y area 31*f*, mixed color area of the Y area 31*f* and the G area 31*b*, mixed color area of the G area 31*b* and the C area 31*e*, mixed color area of the C area 31*e* and the B area 31*c*, mixed color area of the B area 31*c* and the M area 31*d*, and mixed color area of the M area 31*d* and the R area 31*a* shown in FIG. 3A. The value ([A] or [B]) stored in the small classification column "m" indicates information regarding selection between the A tub button 14*e* and the B tub button 14*f* on the menu screen 14*c* of FIG. 22. The values stored in the small classification columns "a", "b", c and "d" indicate the drive timing (rotation angle) of an image signal for each mixed color area of the color wheel 31.

FIG. 23B is a conceptual diagram of the stored values in the small classification columns "a", "b", "c", and "d". In this diagram, the horizontally-long band-shaped figure represents the light color emitted from the color wheel 31. The figure on the left produced when the band-shaped figure is separated by a rightward descending oblique line represents the light of a first spectrum area. The figure on the right separated by the same oblique line represents the light of a second spectrum area that adjoins the first spectrum area. For example, if the light of the first spectrum area is assumed to be "red (R)" of the R area 31*a* and the light of the second spectrum area is assumed to be "yellow (Y)" of the Y area 31*f*, a mixed color (R/Y) that gradually changes from red to yellow is obtained in an area where the oblique line runs. The stored values (a', b', c', and d', or a'', b'', c'', and d'', for expediency) in the small classification columns "a", "b", "c", and "d" are for arbitrarily moving the drive timings of a desired image signal back and forth in the shown mixed color area (R→R/Y→Y).

That is, "a" in the small classification column specifies a timing to start driving a desired image signal in the shown mixed color area (R→R/Y→Y). "d" in the small classification column specifies a timing to finish driving a desired image signal in the shown mixed color area (R→R/Y→Y). Further, "b" and "c" in the small classification columns specify a timing to finish driving a desired image signal and a timing to resume driving a desired image signal halfway in the shown mixed color area (R→R/Y→Y).

For example, in a case where the conditions are set such that "a"=60 degrees and "b"="c"="d"=90 degrees and the objective image signal is a W image signal in the large classification column N=1 corresponding to one mixed color area of the color wheel 31, the same control as the first display control mode (see FIG. 15C) of the first embodiment can be performed. In a case where the conditions are set such that "a"="b"="c"="d"=75 degrees and the objective image signal is a Y image signal, the same control as the second display control mode (see FIG. 15D) of the first embodiment can be performed.

In a case where the conditions are set such that "a"="b"="c"="d"=60 degrees and the objective image signal is a Y image signal, the same control as the third display control mode (see FIG. 15E) of the first embodiment can be performed. Further, in a case where the conditions are set such that "a"="b"="c"="d"=90 degrees, the same control as the fourth display control mode (see FIG. 15F) of the first embodiment can be performed.

Thus, angles for each control mode may be pre-stored in the small classification columns ("a", "b", "c" and "d") in each of the lines L1 to L4 of the table 1. For example, in the large classification column N=1 corresponding to one mixed color area of the color wheel 31 shown in FIG. 3A, "a"=60 degrees and "b"="c"="d"=90 degrees may be stored in the small classification columns ("a", "b", "c" and "d") in the line (L1) of fix 1, "a"="b"="c"="d"=75 degrees may be stored in the small classification columns ("a", "b", "c" and "d") in the line (L2) of fix 2, "a"="b"="c"="d"=60 degrees may be stored in the small classification columns ("a", "b", "c" and "d") in the line (L3) of fix 3, and "a"="b"="c"="d"=90 degrees may be stored in the small classification columns ("a", "b", "c" and "d") in the line (L4) of fix 4. By doing so, one of the four display control modes (P1 to P4) of the first embodiment can arbitrarily be performed only by selecting any of the fix 1 mode, the fix 2 mode, the fix 3 mode, and the fix 4 mode on the menu screen 14c of FIG. 22.

The actual display control by the projector 10 is performed in accordance with the table 2 of FIG. 24. The table 2 has the same structure as one line of the above-described table 1. That is, the table 2 comprises one line (currently set line) L1' to which the values in the line (any of L1 to L5) selected from the table 1 are copied, large classification columns each indicating a number N corresponding to one of the mixed color areas of the color wheel 31, and small classification columns m, a, b, c, and d generated by dividing each large classification column into five.

Accordingly, in a case where, for example, the fix 1 mode is selected on the menu screen 14c of FIG. 22, the values in the line of fix 1 (L1) in the table 1 are copied to the able 2. Then, the projector 10 performs a required display control in accordance with the values of "m", "a", "b", "c", and "d" copied to the currently set line (L1') in the table 2.

As described above, according to the present embodiment, the display control can be performed by copying the values in each line (fix 1 to fix 4) of the table 1 to the table 2. However, this display control is based on fixed values likewise in the first embodiment described above, and not greatly different from the first embodiment. The feature of the present embodiment lies in the manual mode in which the set values can be arbitrarily changed.

That is, when the manual mode (the button object 14m) is selected on the menu screen 14c of FIG. 22, the determination result at step S20 of FIG. 21 is "YES", and the process branches to the flowchart of FIG. 25. In this flowchart, the central control unit 22 first receives a user operation to choose either doing manual setting or storing the thusly set values in the table 1 (step S29), and determines this user operation (step S30). In a case where doing manual setting is chosen, the central control unit 22 initializes a loop variable N corresponding to the mixed color areas of the color wheel 31 (step S31), and performs the following loop process.

In this loop process, the central control unit 22 increments N by 1 (step S32), and receives user inputs for "a" coordinates to "d" coordinates (step S34 to step S37). Then, the central control unit 22 determines whether the value of N reaches the maximum value (Nmax=6) of the number N corresponding to each mixed color area of the color wheel 31 (step S38). In a case where N has not yet reached its maximum, the central control unit 22 repeats the above-described loop (step S32 to step S37). On the other hand, in a case where N has reached its maximum, the central control unit 22 gets out from the loop. Then, the central control unit 22 stores the respective user inputs for N=1 to N=6, i.e., a display setting [A] or [B], and the "a" coordinates to "d" coordinates in the line (L5) of manual (manual mode) in the table 1 (step S39). Then, the central control unit 22 copies the stored line (L5) in the table 1 to the table 2 (step S40), and returns to the flowchart of FIG. 21.

As described above, according to the second embodiment, a line (L5) for the manual mode is provided in the table 1. Since the values in the line (L5), i.e., "m", "a", "b", "c" and "d" can be arbitrarily set in accordance with user's requirements, flexibility in the display control can be improved as compared to the above-described first embodiment.

That is, according to the above-described first embodiment, a W image signal, a Y image signal, etc. are displayed at timings corresponding to the predetermined rotation angles (0 degree, 60 degrees, 90 degrees, 105 degrees, 120 degrees, 180 degrees, 195 degrees, 210 degrees, 225 degrees, 240 degrees, 300 degrees, 315 degrees, 330 degrees, and 345 degrees) of the color wheel 31. However, according to the "manual mode" of the second embodiment, image display can be performed at free timings not fixedly to these rotation angles. Therefore, more minute and flexible display control can be performed that matches the preference of individual users, the content of the image to be projected, the environments in which the projector 10 is used, etc.

Third Embodiment

The above-described embodiments were explained by employing the color wheel 31 having the six-divided structure as an example. However, the sprit of the present invention is not limited to this "dividing number". The point of the present invention lies in the display control at the boundary between one spectrum area of the color wheel and another spectrum area thereof. Thus, the color wheel needs only to have at least a first area and a second area that have two different color spectrum characteristics.

In the above-described embodiments, the center angle of the color wheel 31 that corresponds to the size of the hot spot is 30 degrees. In this case, the mixed-color period (a period in which the hot spot is going across areas (segments) having different spectrum characteristics) is normally ¼ of the period for the color wheel to make one turn in case of a color wheel having three segments, ⅓ of the same period in case of a color wheel having four segments, and a long period amounting to ½ of the same period in case of a color wheel having six segments.

That is, the present invention can also be applied to a color wheel having four segments made up of RGBW as shown in FIGS. 30 to 33.

If the hot spot is too small-sized, the temperature of the hot spot becomes so high that the color wheel might be thermally broken. Therefore, as in the present invention, the hot spot is normally made to have a substantial size.

Hence, it can be said that the control method of the present invention is effective in a case where a color wheel having many segments is used, that is, particularly effective in a case where such a color wheel as described above that has six segments is used.

Further, even in a case where a color wheel having three segments is used, since the mixed-color period is such a long time as amounting to ¼ in the above-described case, there is still a merit in applying the present invention.

The following explanation will be made by focusing on the display control at the boundary between one spectrum area of the color wheel and another spectrum area thereof.

The control method itself to be described in the present embodiment is completely the same as that described in the second embodiment, and the following will explain the details of this method.

FIG. 26 is a structure diagram of the color wheel to be used in the third embodiment. The color wheel 38 shown in FIG. 26 comprises at least one spectrum area (hereinafter referred to as first area) 39, and another spectrum area (hereinafter referred to as second area) 40 having a different color from that of the fist area 39. A spotlight 41 having a white color is irradiated on a fixed position existing on a radius of the color wheel 38, and the color (red (R), for expediency) of the first area 39, the mixed color R/Y of the color R of the first area 39 and the color (yellow (Y), for expediency) of the second area 40, and the color Y of the second area 40 are sequentially emitted from the color wheel 38 along with the rotation of the color wheel 38.

FIGS. 27A and 27B are timing charts showing the drive timings of the color wheel 38. Two patterns of drive timings are shown here. In any of these two patterns of drive timings, required image signals are displayed at timings determined by "a", "b", "c" and "d" in the table 2 described above. However, the difference is in these image signals. That is, according to the drive timings shown in FIG. 27A, an R image signal is displayed until "a", a W image signal is displayed from "a" to "b", a black image signal is displayed from "b" to "c", a W image signal is displayed from "c" to "d", and a Y image signal is displayed after "d". As compared to this, according to the drive timings shown in FIG. 27B, an R image signal is displayed until "a", a black image signal is displayed from "a" to "b", a W image signal is displayed from "b" to "c", a black image signal is displayed from "c" to "d", and a Y image signal is displayed after "d".

In a case where the manual mode is selected, it is possible to freely set "a" to "d" likewise the second embodiment. For example, if "b" and "c" are set to the same values in the pattern of drive timings shown in FIG. 27A, it is possible not to display the black image signal, but to display the W image signal throughout "a" to "d". If the value of "a" is increased (shifted rightward in the drawing) in the same pattern of drive timings, it is possible to increase the ratio of the R image signal, while contrarily if the value of "a" is decreased (shifted leftward in the drawing), it is possible to reduce the ratio of the R image signal. If the value of "d" is reduced (shifted leftward in the drawing) in the same pattern of drive timings, it is possible to increase the ratio of the Y image signal, while contrarily if the value of "d" is increased (shifted rightward in the drawing), it is possible to reduce the ratio of the Y image signal.

Likewise, if "b" and "c" are set to the same value in the pattern of drive timings shown in FIG. 27B, it is possible not to display the W image signal but to display the black image signal throughout "a" to "d". If the value of "a" is increased (shifted rightward in the drawing) in the same pattern of driving timings, it is possible to increase the ratio of the R image signal, while contrarily if the value of "a" is reduced (shifted leftward in the drawing), it is possible to reduce the ratio of the R image signal. If the value of "d" is reduced (shifted leftward in the drawing) in the same pattern of driving timings, it is possible to increase the ratio of the Y image signal, while contrarily if the value of "d" is increased (shifted rightward in the drawing), it is possible to reduce the ratio of the Y image signal.

FIGS. 28A to 28E are diagrams showing some adjustment results according to the third embodiment. First, FIG. 28A shows an example that "a" to "d" are set at a position shifted leftward in the drawing from the boundary between the first area 39 and the second area 40 by a predetermined amount (the length of the half of the diameter of the spotlight 41). By this setting, the ratio of the color (Y) of the second area 40 is increased by an amount corresponding to the length of the diameter of the spotlight 41, with the boundary between the first area 39 and the second area 40 seen as the center of the diameter. Therefore, the color (Y) is emphasized.

FIG. 28B shows an example that "a" to "d" are set at the boundary between the first area 39 and the second area 40. By this setting, the left half of a mixed color area 42 in the drawing (corresponding to the length of the half of the diameter of the spotlight 41) has the same color (R) as that of the first area 39, and the right haft of the mixed color area 42 in the drawing (corresponding to the length of the half of the diameter of the spotlight 41) has the same color (Y) as that of the second area 40. Therefore, the color (R) of the first area 39 and the color (Y) of the second area 40 are increased equally to improve the color shading.

FIG. 28C shows an example that "b" and "c" are set at the boundary between the first area 39 and the second area 40, "a" is shifted leftward in the drawing from the boundary between the first area 39 and the second area 49 while "d" is shifted rightward in the drawing from the boundary between the first area 39 and the second area 40, and a W image signal is driven in the period of "a" to "d". By this setting, a W image is displayed during a period ("a" to "d") that spreads to the left and right of the boundary between the first area 39 and the second area 49, the same color (R) as that of the first area 39 is displayed during a period on the left of the W display period in the drawing, and the same color (Y) as that of the second area 40 is displayed during a period on the right of the W display period in the drawing. Accordingly, the color shading is improved as much as the color (R) of the first area 39 and the color (Y) of the second area 40 are increased, and the luminance is improved as much as the amount of the W display.

FIG. 28D shows an example that "a" and "b" are shifted leftward in the drawing from the boundary between the first area 39 and the second area 40 by a predetermined amount (corresponding to the length of the half of the diameter of the spotlight 41), "c" and "d" are shifted rightward in the drawing from the boundary between the first area 39 and the second area 40 by a predetermined amount (corresponding to the length of the half of the diameter of the spotlight 41), and a black image signal is driven during a period from "a" and "b" to "c" and "d". By this setting, the black image is displayed throughout the period of "a" and "b" to the "c" and "d". Accordingly, the color purity can be increased since no color is displayed wastefully.

FIG. 28E shows an example that "a" and "b" are shifted leftward in the drawing from the boundary between the first area 39 and the second area 40 by a predetermined amount (corresponding to the length of the half of the diameter of the spotlight 41), "c" and "d" are shifted rightward in the drawing from the boundary between the first area 39 and the second area 40 by a predetermined amount (corresponding to the length of the half of the diameter of the spotlight 41), and a W image signal is driven during a period from "a" and "b" to "c" and "d". By this setting, the W image is displayed throughout the period from "a" and "b" to "c" and "d". Therefore, the luminance can be increased to the maximum.

In the above explanation, a luminance image may be displayed instead of the W image during the period of W image display. In such a case, not only an image having a relatively high brightness can be displayed, but also an image having a high contrast can be displayed.

As described above, according to the third embodiment, it is possible to freely make adjustments such as emphasizing a specific color (FIG. 28A), improving the color shading (FIG. 28B), balancing the color shading and the luminance (FIG. 28C), increasing the color purity (FIG. 28D), or maximizing the luminance (FIG. 28E), etc., in accordance with the demands of the user. In addition, in these adjustments, "a", "b", "c", and "d" can be set to arbitrary values by the "manual mode" of the second embodiment. Therefore, for example, the "emphasizing degree" of a specific color, the "improving degree" of the color shading, the "balancing degree" of the color shading and the color purity, the "balancing degree" of the color shading and the luminance, the "increasing degree" of the luminance, etc. can be set very flexibly. Thus, it is possible to perform more minute and flexible display control that matches the preference of each user, the content of the image to be projected, the environment in which the projector 10 is used, etc.

The central control unit 22 of the projector 10 can be realized not by a dedicated system, but by an ordinary computer system. For example, a computer program for realizing the above-described operations may be stored and distributed in a computer-readable recording medium (a flexible disk, a CD-ROM, a DVD-ROM, etc.), and the central control unit 22 that performs the above-described processes may be constructed by installing the computer program on a computer. Further, the computer program may be stored on a storage device possessed by a server apparatus existing on a communication network such as the Internet or the like, and an ordinary computer system may download the computer system to construct the central control unit 22 of the present invention.

In a case where each of the above-described functions is realized by division of the shares of tasks between an OS (Operating System) and an application program, or by cooperation of the OS and the application program, only the part of the application program may be stored in a recording medium or a storage device.

Furthermore, the above-described computer program may be embedded on a carrier wave and distributed through a communication network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-201577 filed on Jul. 11, 2005 and including specification, claims, drawings and summary. The disclosure of the above Japanese Patent Application is incorporated herein by reference in its entirety.

What is claimed is:

1. A projection display apparatus, comprising:
   a light source which emits a spotlight having a white color;
   a color wheel on which a plurality of transmission areas having different light transmission characteristics are arranged in a direction of a circumference of the color wheel;
   a modulation unit which modulates the spotlight based on image data in a mixed-color period in which, due to rotation of the color wheel, the spotlight from the light source passes through the color wheel at a boundary between a first transmission area and a second transmission area which are adjacent to each other and have different transmission characteristics; and
   a timing change unit which enables a user to switch a timing, at which the image data, based on which the spotlight is modulated, is switched to other image data, to any given time in the mixed-color period.

2. The projection display apparatus according to claim 1, wherein the transmission areas of the color wheel include transmission areas corresponding respectively to three primary colors of light and transmission areas corresponding respectively to complementary colors of the three primary colors of light, and
   wherein each of the transmission areas corresponding to one of the complementary colors corresponding to a medium color of two of the primary colors is arranged between the transmission areas corresponding respectively to the two primary colors.

3. The projection display apparatus according to claim 2, wherein the color wheel is structured such that a center angle of the transmission areas corresponding to the complementary colors is equal to or smaller than a center angle of the transmission areas corresponding to the primary colors.

4. The projection display apparatus according to claim 2, wherein the timing change unit can designate a period in which the spotlight is modulated based on image data corresponding to a color of the first transmission area.

5. The projector display apparatus according to claim 2, wherein the timing change unit can designate a period in which the spotlight is modulated based on image data corresponding to a color of the second transmission area.

6. The projection display apparatus according to claim 2, wherein the timing change unit can designate a period in which the spotlight is modulated based on luminance image data.

7. The projection display apparatus according to claim 1, wherein the timing change unit can designate a period in which the spotlight is modulated based on image data corresponding to a color of the first transmission area.

8. The projection display apparatus according to claim 1, wherein the timing change unit can designate a period in which the spotlight is modulated based on image data corresponding to a color of the second transmission area.

9. The projection display apparatus according to claim 1, wherein the timing change unit can designate a period in which the spotlight is modulated based on luminance image data.

10. The projection display apparatus according to claim 1, wherein four transmission areas including transmission areas corresponding to three primary colors of light of red, blue, and green, and an uncolored transmission area which transmits a white light are arranged on the color wheel in the direction of circumference of the color wheel.

11. A control method of a projection display apparatus, which comprises a light source for emitting a spotlight having a white color, and a color wheel on which a plurality of transmission areas having different light transmission characteristics are arranged in a direction of a circumference of the color wheel, the control method comprising:

modulating the spotlight based on image data in a mixed-color period in which, due to a rotation of the color wheel, the spotlight from the light source passes through the color wheel at a boundary between a first transmission area and a second transmission area which are adjacent to each other and have different transmission characteristics; and accepting an input by a user to switch a timing, at which the image data, based on which the spotlight is modulated, is switched to other image data, to any given time in the mixed-color period.

12. The control method of the projection display apparatus according to claim 11, wherein the transmission areas of the color wheel include transmission areas corresponding respectively to three primary colors of light and transmission areas corresponding respectively to complementary colors of the three primary colors of light, and wherein each of the transmission areas corresponding to one of the complementary colors corresponding to a medium color of two of the primary colors is arranged between the transmission areas corresponding respectively to the two primary colors.

13. The control method of the projection display apparatus according to claim 12, wherein the color wheel is structured such that a center angle of the transmission areas corresponding to the complementary colors is equal to or smaller than a center angle of the transmission areas corresponding to the primary colors.

14. A computer-readable non-transitory recording medium having stored thereon a program that is executable by a computer of a projection display apparatus, which comprises a light source for emitting a spotlight having a white color, and a color wheel on which a plurality of transmission areas having different light transmission characteristics are arranged in a direction of a circumference of the color wheel, the program being executable by the computer to cause the computer to perform functions comprising:

modulating the spotlight based on image data in a mixed-color period in which, due to a rotation of the color wheel, the spotlight from the light source passes through the color wheel at a boundary between a first transmission area and a second transmission area which are adjacent to each other and have different transmission characteristics; and accepting an input by a user to switch a timing, at which the image data, based on which the spotlight is modulated, is switched to other image data, to any given time in the mixed-color period.

15. The computer-readable non-transitory recording medium according to claim 14, wherein the transmission areas of the color wheel include transmission areas corresponding respectively to three primary colors of light and transmission areas corresponding respectively to complementary colors of the three primary colors of light, and wherein each of the transmission areas corresponding to one of the complementary colors corresponding to a medium color of two of the primary colors is arranged between the transmission areas corresponding respectively to the two primary colors.

16. The computer-readable non-transitory recording medium according to claim 15, wherein the color wheel is structured such that a center angle of the transmission areas corresponding to the complementary colors is equal to or smaller than a center angle of the transmission areas corresponding to the primary colors.

17. A projection display apparatus, comprising:

a light source which emits a spotlight having a white color;

a color wheel on which a plurality of transmission areas having different light transmission characteristics are arranged in a direction of a circumference of the color wheel;

a modulation means for modulating the spotlight based on image data in a mixed-color period in which, due to a rotation of the color wheel, the spotlight from the light source passes through the color wheel at a boundary between a first transmission area and a second transmission area which are adjacent to each other and have different transmission characteristics; and a timing change means for enabling a user to switch a timing, at which the image data, based on which the spotlight is modulated, is switched to other image data, to any given time in the mixed-color period.

* * * * *